United States Patent [19]

Wakami et al.

[11] Patent Number: 5,191,638
[45] Date of Patent: Mar. 2, 1993

[54] FUZZY-BOOLEAN MULTI-STAGE INFERENCE APPARATUS

[75] Inventors: Noboru Wakami, Hirakata; Isao Hayashi, Toyonaka; Hiroyoshi Nomura, Neyagawa; Eiichi Naito, Osaka, all of Japan

[73] Assignee: Matsushita Electric Industrial Co., Ltd., Osaka, Japan

[21] Appl. No.: 501,037

[22] Filed: Mar. 29, 1990

[30] Foreign Application Priority Data

| Mar. 31, 1989 [JP] | Japan | 1-083402 |
| Mar. 31, 1989 [JP] | Japan | 1-083404 |
| Mar. 31, 1989 [JP] | Japan | 1-083405 |
| Mar. 31, 1989 [JP] | Japan | 1-083407 |
| Mar. 31, 1989 [JP] | Japan | 1-083408 |
| Mar. 31, 1989 [JP] | Japan | 1-083410 |

[51] Int. Cl.⁵ .................. G06F 9/44; G05B 13/02
[52] U.S. Cl. ............................. 395/51; 395/900; 395/11; 395/61; 395/54
[58] Field of Search ............ 364/513, 207; 395/61, 395/900, 11, 51, 54

[56] References Cited

U.S. PATENT DOCUMENTS 4,777,585 10/1988 Kokawa et al. ............ 364/164

FOREIGN PATENT DOCUMENTS 63-186303 8/1988 Japan.

OTHER PUBLICATIONS

K. S. Leung, et al, "Applications of a Novel Fuzzy Expert System Shell", EXPERT SYSTEMS Vol. 6 No. 1, pgs 2-10, Feb. 1989.
K. S. Leung, et al, "A Fuzzy Knowledge-Based System Shell—System Z-1 Proceedings, Tencon 87, 1987 IEEE Region 10 Conference, Computers And Communications Toward 2000, vol. 2, pgs 655-659 August 25, 1987.

Primary Examiner—Allen R. MacDonald
Attorney, Agent, or Firm—Stevens, Davis, Miller & Mosher

[57] ABSTRACT

An inference conducted by use of fuzzy knowledge can be directly written in inference rules. It is possible to use ambiguous language expressions and freely describe flexible knowledge, although ambiguous, in a knowledge base. The user specifies execution priority orders or conviction degrees of inference rules such that even when an antecedent contains a confirmative or determinant action, a contention between rules is prevented. An intermediate results of a fuzzy inference is passed in a form of a real number or a fuzzy label to the next inference to achieve a fuzzy multi-stage inference. A multi-stage inference conducting a backtrack operation based on fuzzy knowledge is implemented to reflect a user's ambiguous knowledge. An inference method associated with a best value retrieval function is provided, in contrast to the conventional method in which a fuzzy inference and a binary logic inference are continuously achieved from an upper-level retrieval or search point to a lower-level retrieval point in a one-directional manner.

29 Claims, 41 Drawing Sheets

FIG. 5
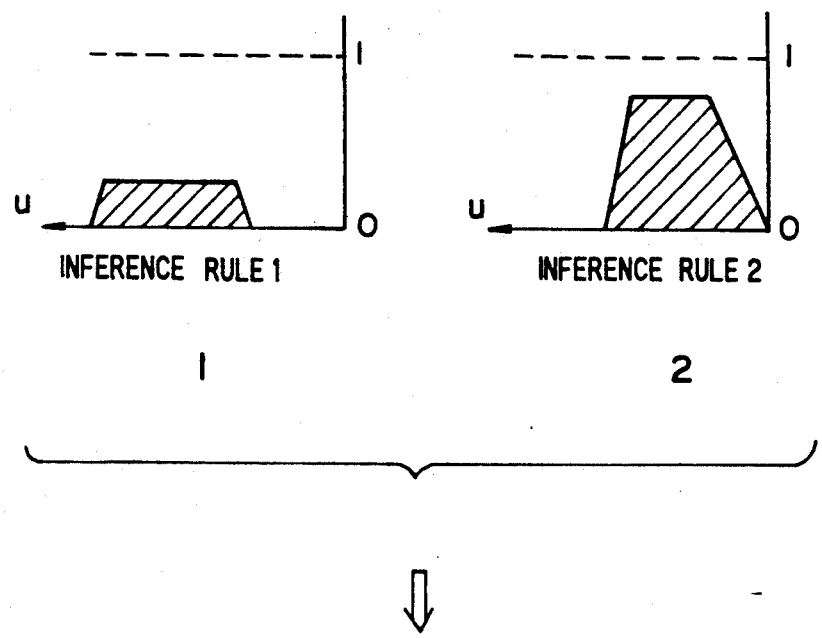
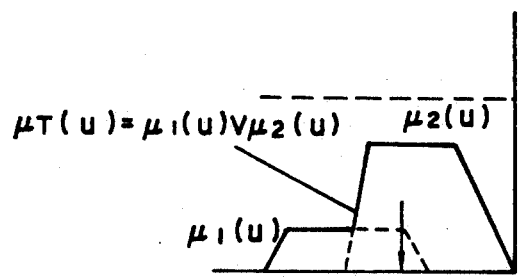

FIG. 7

INFERENCE RULE STORE SECTION 641  64

KNOWLEDGE SOURCE A (STOCK EXCHANGE)

| No | KIND | ANTECEDENT | CONSEQUENT | NEXT KNOWLEDGE SOURCE |
|---|---|---|---|---|
| 1 | A | AMOUNT < 10 MILLION YEN | SELL 10 MILLION SHARES CALL INFORM, SELL (TO Mr. A) | KNOWLEDGE SOURCE B |
| 2 | A | AMOUNT IS SMALL | SELL 2 THOUSAND SHARES | — |
| 3 | F | AMOUNT ≥ 50 MILLION YEN | PROFIT IS LARGE | |
| 4 | F | AMOUNT IS VERY GREAT | PROFIT IS VERY LARGE | |
| ⋮ | ⋮ | ⋮ | ⋮ | ⋮ |
| 100 | NK | FINISH COMPLETELY | KNOWLEDGE SOURCE B | KNOWLEDGE SOURCE B |

FIG. 9

INFERENCE RULE STORE SECTION 84

BINARY LOGIC INFERENCE KNOWLEDGE GROUP

| No. | ANTECEDENT | CONSEQUENT | NEXT KNOWLEDGE SOURCE |
|---|---|---|---|
| 1 | SELL SHARES | CHECK DEPOSIT AMOUNT | KNOWLEDGE SOURCE E(A) |
| 2 | SELL OF SHARES IS SMALL | EXCHANGE SHARES ON EACH SETTLEMENT | KNOWLEDGE SOURCE G(F) |
| ---- | ---- | ---- | ---- |

FUZZY INFERENCE KNOWLEDGE GROUP

KNOWLEDGE SOURCE A

| No. | ANTECEDENT | CONSEQUENT | NK |
|---|---|---|---|
| 1 | AMOUNT ≥ 50 MILLION YEN, SHARE PRICE OF FIRM A < 500 YEN | BUY OF SHARES IS GREAT | FINISH COMPLETELY |
| 2 | AMOUNT IS VERY GREAT | BUY OF SHARES IS VERY GREAT | KNOWLEDGE SOURCE A (A) |
| ---- | ---- | ---- | ---- |

| x1 Label | -6 | -5 | -4 | -3 | -2 | -1 | 0 | 1 | 2 | 3 | 4 | 5 | 6 |
|---|---|---|---|---|---|---|---|---|---|---|---|---|---|
| A11 | 0 | 0 | 0 | 0 | 0 | 0.3 | 0.7 | 1.0 | 0.7 | 0.3 | 0 | 0 | 0 |
| A21 | 0 | 0 | 0.3 | 0.7 | 1.0 | 0.7 | 0.3 | 0.1 | 0 | 0 | 0 | 0 | 0 |
| A31 | 0 | 0 | 0 | 0 | 0 | 0 | 0.1 | 0.3 | 0.7 | 1.0 | 1.0 | 1.0 | 1.0 |
| ⋮ | ⋮ | ⋮ | ⋮ | ⋮ | ⋮ | ⋮ | ⋮ | ⋮ | ⋮ | ⋮ | ⋮ | ⋮ | ⋮ |
| An1 | 0 | 0 | 0 | 0.3 | 0.7 | 1.0 | 0.7 | 0.3 | 0 | 0 | 0 | 0 | 0 |

FIG. 18

TIME t (1ST STAGE INFERENCE)

| INPUT | | ANTECEDENT | | CONSEQUENT | INFERENCE RESULT | INFERENCE RESULT PROCESSING |
|---|---|---|---|---|---|---|
| DISTANCE BETWEEN CARS | RUNNING SPEED | DISTANCE BETWEEN CARS CL | RUNNING SPEED CS | BRAKE RATE BR | BRAKE RATE TI | BRAKE RATE $u_1^*$ |
| (m) CL | (km/h) CS | | | | | |
| 30 | 60 | PS (25, 50) (NOT SO SUFFICIENT) | PB (50, 100) (HIGH SPEED) | MIN OPERATION PB (SUDDEN BRAKE) | MAX OPERATION | |
| | | PB (25, 50) (SUFFICIENT) | PS (50, 100) (LOW SPEED) | PS (WEAK BRAKE) | | |

TIME t (2ND STAGE INFERENCE)

| INPUT | ANTECEDENT | CONSEQUENT | INFERENCE RESULT | INFERENCE RESULT PROCESSING |
|---|---|---|---|---|
| BRAKE RATE $u_1^*$ | BRAKE RATE BR | INTENSITY OF WARNING TONE TO PASSENGERS | INTENSITY $U_2$ OF WARNING TONE TO PASSENGERS | INTENSITY $U_2^*$ OF WARNING TONE TO PASSENGERS |
| | PS (LOW) | MIN OPERATION PS (SOFT VOICE) | MAX OPERATION | |
| | PM (ORDINARY) | PM (INTERMEDIATE VOICE) | | |
| | PB (HIGH) | PB (LOUD VOICE) | | |

FIG. 20
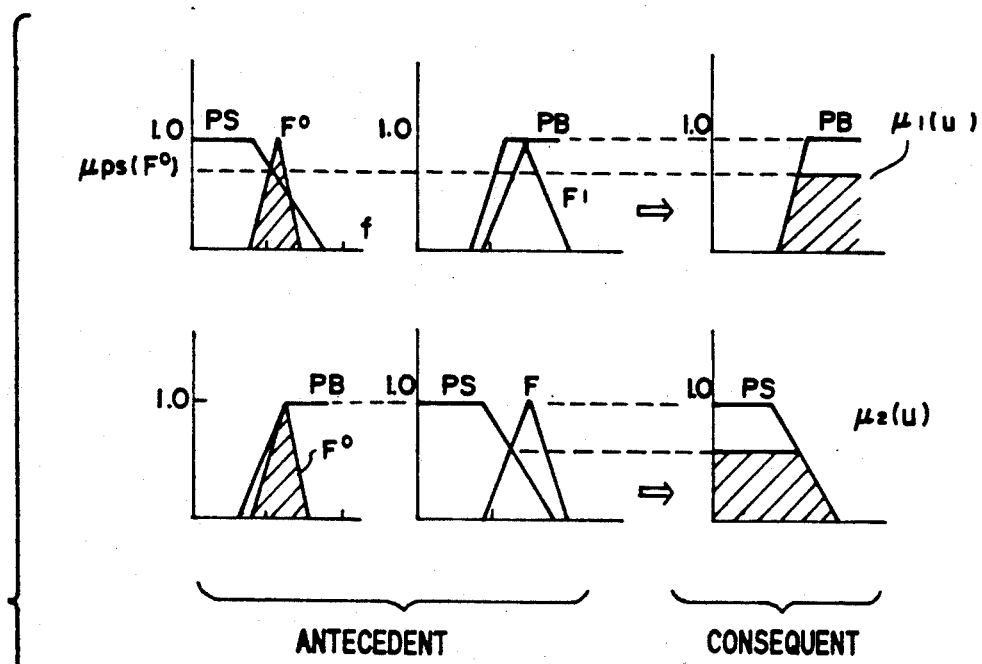
ANTECEDENT — CONSEQUENT
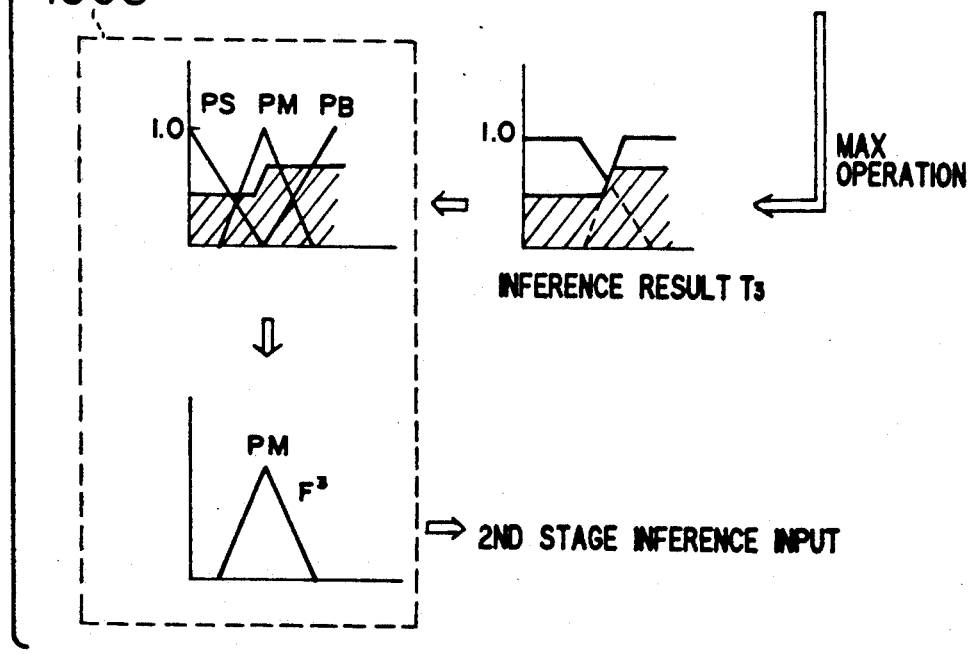
INFERENCE RESULT T₃
MAX OPERATION
⇒ 2ND STAGE INFERENCE INPUT

FIG. 24

| ANTECEDENT | | | CONSEQUENT |
|---|---|---|---|
| PRECEDING LINE | MATERIAL 1 QUANTITY | MATERIAL 2 QUANTITY | SUCCEEDING LINE |
| NONE | LARGE | LARGE | X |
| NONE | LARGE | SMALL | Y |
| NONE | SMALL | LARGE | Y |
| X | LARGE | LARGE | X |
| X | LARGE | SMALL | Y |
| X | SMALL | LARGE | Y |
| Y | LARGE | LARGE | X |
| Y | LARGE | SMALL | Y |
| Y | SMALL | LARGE | Z |
| Z | LARGE | LARGE | Y |
| Z | LARGE | SMALL | Z |
| Z | SMALL | LARGE | Z |
| Z | SMALL | SMALL | END |

FIG. 28

| ANTECEDENT | | | CONSEQUENT |
|---|---|---|---|
| CURRENT OPERATION LINE | MATERIAL 1 QUANTITY | MATERIAL 2 QUANTITY | NEXT OPERATION LINE |
| NONE | LARGE | LARGE | X |
| NONE | LARGE | SMALL | Y |
| NONE | SMALL | LARGE | Y |
| NONE | SMALL | SMALL | Z |
| X | LARGE | LARGE | X |
| X | LARGE | SMALL | X |
| X | SMALL | LARGE | Y |
| X | SMALL | SMALL | Z |
| Y | LARGE | LARGE | X |
| Y | LARGE | SMALL | Y |
| Y | SMALL | LARGE | Y |
| Y | SMALL | SMALL | Z |
| Z | LARGE | LARGE | X |
| Z | LARGE | SMALL | Y |
| Z | SMALL | LARGE | Z |
| Z | SMALL | SMALL | |

FIG. 29

FUNCTION
OPERATION

TOTAL PRODUCTION = TOTAL PRODUCTION + DAILY PRODUCTION (CURRENT LINE)

TOTAL COST = TOTAL COST + DAILY COST (CURRENT LINE)

AVERAGE COST = TOTAL COST / TOTAL PRODUCTION

EVALUATION VALUE
COMPUTATION

| VARIABLE | OPERATOR | VALUE |
|---|---|---|
| TOTAL PRODUCTION | = | TARGET PRODUCTION |
| AVERAGE COST | = | UPPER-LIMIT AVERAGE COST |

FIG. 39

KS 0 (AMOUNT RETENTION BY STOCK EXCHANGE)

① IF AMOUNT IS ABOUT 10 MILLION YEN   THEN addcopy N11A (REDUCE NUMBER OF EXCHANGE SHORES OF FIRM A BY 10 THOUSAND)
   go to KS11A
   SHARE PRICE OF FIRM A IS ABOUT      addcopy N11B (REDUCE NUMBER OF EXCHANGE SHARES OF FIRM A BY 8 THOUSAND)
   8 HUNDRED YEN                       go to KS11B ② IF AMOUNT IS LARGE                  THEN addcopy N12 (INCREASE NUMBER OF EXCHANGE SHARES OF FIRM B BY
   SHARE PRICE OF FIRM A IS ABOUT          20 THOUSAND) go to KS12
   500 YEN ③ IF AMOUNT IS VERY LARGE             THEN addcopy N13 (INCREASE NUMBER OF EXCHANGE SHARES OF FIRM BY 50 THOUSAND)
   SHARE PRICE OF FIRM A IS ABOUT          go to KS 13
   200 YEN OR LESS ④ IF AMOUNT IS SMALL                  THEN NUMBER OF INFORMATION COLLECTION IS LARGE
   SHARE PRICE OF FIRM A IS
   VERY HIGH

- - -

KS11A (INVESTMENT)

① IF REDUCE NUMBER OF EXCHANGE        THEN addcopy N21 (INCREASE INVESTMENT AMOUNT FOR FIRM C BY 5 MILLION YEN)
   SHARES OF FIRM A                        go to KS 21
   ORDINARY PROFIT OF FIRM C IS
   ABOUT 50 MILLION YEN ② IF REDUCE NUMBER OF EXCHANGE        THEN addcopy N22A (INCREASE INVESTMENT AMOUNT FOR FIRM C BY 10 MILLION YEN)
   SHARES OF FIRM A                        go to KS22A
   ORDINARY PROFIT OF FIRM C IS            addcopy N22B (INCREASE INVESTMENT AMOUNT FOR FIRM C BY 30 MILLION YEN)
   ABOUT 100 MILLION YEN                   go to KS22B

| ANTECEDENT | | | CONSEQUENT |
|---|---|---|---|
| CURRENT OPERATION LINE | MATERIAL 1 QUANTITY | MATERIAL 2 QUANTITY | NEXT OPERATION LINE |
| NONE | LARGE | LARGE | X |
| NONE | LARGE | SMALL | Y |
| NONE | SMALL | LARGE | Y |
| NONE | SMALL | SMALL | Z |
| X | LARGE | LARGE | X |
| X | LARGE | SMALL | X |
| X | SMALL | LARGE | Y |
| X | SMALL | SMALL | Z |
| Y | LARGE | LARGE | X |
| Y | LARGE | SMALL | Y |
| Y | SMALL | LARGE | Y |
| Y | SMALL | SMALL | Z |
| Z | LARGE | LARGE | X |
| Z | LARGE | SMALL | Y |
| Z | SMALL | LARGE | Z |
| Z | SMALL | SMALL | Z |

FUZZY-BOOLEAN MULTI-STAGE INFERENCE APPARATUS

BACKGROUND OF THE INVENTION

The present invention relates to an inference apparatus in which an inference is conducted by use of ambiguous knowledge of experts in a computer.

FIG. 1 shows a configuration diagram of a conventional multi-stage inference apparatus. This system includes a data input section 101 for receiving input data from an external device, a work area 102 for storing therein the input data and an intermediate result of an inference, an inference rule store section 103 for storing therein a plurality of inference rules, an inference engine section 104 for receiving as an input thereto the data stored in the work area 102 so as to achieve a multistage inference thereon based on inference rules loaded in the inference rule store section 103, and a result output section 105 for producing an inference result.

The inference rules stored in the inference rule storage 103 are represented in a form of:

if (antecedent) then (consequent), where the consequent includes an instruction of a variable operation, an instruction to write an intermediate inference result in a work area, an instruction of a device operation, and the like. FIG. 2 shows an example of a knowledge base comprising a plurality of inference rules, which will be next described. Knowledge items of experts are accumulated to be stored in a knowledge base 24. Ordinarily, the knowledge is subdivided into knowledge sources such as a knowledge source 201 related to stock exchange and a knowledge source 202 associated with capital investment for a firm or company (B). A knowledge base includes a plurality of such knowledge sources each containing a plurality of production rules. For example, the knowledge source 201 includes production rules such as "If the amount is less than 10 million yen and the share price of the firm A is at least 800 1 yen, sell the 10 thousand shares of the firm A" and "If the amount remaining is at least 10 million yen, do not sell shares". For these rules, during an inference execution, when a new input data item is received, for example, as "The amount is eight million yen and the share price of the firm A is increased to 1000 yen", the first production rule stored in the knowledge source 201 is activated or fired so as to pass control to the next knowledge source, namely, the knowledge source B. If the profit of the stock exchange results in 1.5 million yen, the first production rule of the subsequent knowledge source 02 is fired. Through the multi-stage inference from the knowledge source A to the knowledge source B, an intermediate inference result is attained as "Conduct capital investment of 500 thousand yen for the firm B".

On the other hand, in the inference method of if (antecedent) then (consequent), there may be used a fuzzy inference.

A description will now be given of a method of determining a control quantity or amount based on the conventional fuzzy inference.

For example, let us consider a simple temperature control for keeping a room temperature at a predetermined value. A relationship between two inputs including a difference e between the room temperature and a target temperature and a change rate de thereof and a control output (operation quantity or amount) u representing a caloric energy of a heater can be described in the If and Then rule as follows.

IF e is Approximate Zero and de is Positive Medium
 THEN u is Negative Medium. (1)

The inference rule of the expression (1) means that if the room temperature is near the target temperature and is increasing at an intermediate magnitude (gradually), decrease the caloric energy to an intermediate level. A fuzzy control (inference) is achieved by preparing a plurality of these inference rules. For example, the following second rule is disposed.

IF e is Approximate Zero and de is Approximate
 Zero THEN u is Negative Small, where the portions of IF—, THEN—, and "e is Approximate Zero", and "U is Negative Medium" are respectively called an antecedent, a consequent, an antecedent proposition or statement, and a consequent proposition. Items such as Approximate Zero and Positive Medium are labels representing input and output fuzzy numbers employed in the rule descriptions and are called fuzzy variables. FIG. 3 shows an example of the fuzzy variables. Ordinarily, a fuzzy variable is set as a membership function having a symmetrical triangular contour. Fuzzy variables commonly adopted include Negative Big (NB), Negative Medium (NM), Negative Small (NS), Approximate Zero (ZO), Positive Small (PS), Positive Medium (PM), and Positive Big (PB) (FIG. 3).

Next, a description will be given of a fuzzy inference process. As input values actually obtained from various sensors, ordinary real numbers $e^o$ and $de^o$ are measured so as to attain a fuzzy number as a final result of an inference rule (first rule) from the expression (1) as follows.

$$\mu_1(u) = \mu_{ZO}(e^o) \wedge \mu_{PM}(de^o) \wedge \mu_{NM}(u)$$

where $\wedge$ designates min and fuzzy data $F^o$ is a fuzzy number of a rectangular form similar to a fuzzy variable. FIG. 4 shows a fuzzy variable $\mu_1(u)$. As can be seen from FIG. 4, the value of $\mu_1(u)$ is attained as follows. Namely, a degree (membership value) $\mu_{ZO}(e^o)$ of $e^o$ belonging to a fuzzy number ZO of the antecedent is compared with a degree $\mu_{PM}(ye^o)$ of $de^o$ belonging to a fuzzy number PM such that the degree $\mu_{ZO}(e^o)$ having the smallest value is used to cut or clip (min) the fuzzy variable NM of the consequent, thereby obtaining $\mu_1(u)$.

Since a plurality of control rules (1) are used, a fuzzy number T is obtained by combining the fuzzy numbers of all final results by use of the expression (2) as follows.

$$\mu_T(u) = \mu_1(u) \vee \mu_2(u) \vee \ldots \vee \mu_n(u)$$

where V stands for max. As an example, FIG. 5 shows a case (n=2) associated with the first and second rules in which $\mu_T(u) = \mu_1(u) \vee \mu_2(u)$ is obtained. The fuzzy number T is a final fuzzy number representing a control operation quantity; however, the actual control operation quantity $u^o$ is not a fuzzy number but a real number. In consequence, the final result (control operation quantity) $u^o$ is determined by use of an equation presented by the following expression (FIG. 5).

$$u^0 = \frac{\Sigma u \cdot \mu_T(u)\, du}{\Sigma \mu_T(u)\, du} \quad (3)$$

In this connection, although a method of Mamdani has been here described as the inference method, alternative methods are also possible. For example, for the weighted center of gravity of the expression (3), a center value or a maximum value of the resultant fuzzy number may be used.

The operation quantity $u^0$ thus produced is adopted as a control quantity based on the fuzzy inference so as to be used as an operator for a control object.

The conventional inference apparatus including the apparatus above cannot appropriately handle an ambiguous or fuzzy inference. Moreover, such a fuzzy inference apparatus is not provided with a backtracking operation, which is a function associated with a multi-stage inference and a repetitions inference operation. In consequence, there have been heretofore desired a method and an apparatus thereof in which a multi-stage inference is also possible for an ambiguous inference in consideration of the backtracking operation such as in the conventional inference.

SUMMARY OF THE INVENTION

It is therefore a first object of the present invention to provide an expert system having a knowledge base in which based on the configuration above, ambiguous and flexible knowledge of users can be arbitrarily described in association with production rules expressed in the "IF—THEN—" format such that not only the ignition-type inference of the conventional expert system but also a multi-stage inference through the fuzzy inference are enabled and that there is devised a rule description method more suitable for the human expression method as compared with the conventional description method so as to increase flexibility of the rule description, thereby achieving the fuzzy inference.

Furthermore, a second object of the present invention is to enable a fuzzy inference to be achieved in which an adaptation degree is computed for a fuzzy inference rule associated with a value in a work area such that an inference rule having the highest execution priority level is selected from inference rules having an adaptation degree exceeding a predetermined value or an inference rule having the highest priority level is selected in association with an adaptation degree and a conviction degree so as to execute the selected inference rule, thereby achieving the fuzzy inference without causing a contention even when the consequent includes a determinant action.

Moreover, a third object of the present invention is to provide a multi-stage fuzzy inference in which an inference result produced through a stage of a fuzzy inference is processed as an input to a subsequent inference, said inference result being treated as an intermediate result represented by a real number or a fuzzy label.

In addition, a fourth object of the present invention is to enable a fuzzy inference operation in which an adaptation degree is computed for an antecedent of each inference rule associated with an intermediate inference result stored in the work area such that a backtrack operation is started when the adaptation degree meets a preset standard and in which for the intermediate inference result stored in the work area, an evaluation value of each inference rule is computed by use of an evaluation knowledge storage section such that a backtrack operation can be started when the evaluation value satisfies a predetermined standard.

Moreover, a fifth object of the present invention is to propose a best retrieval function method employing a backtrack operation so as to retrieve a knowledge source desired by the user, thereby easily providing an optimal solution.

Furthermore, a sixth object of the present invention is to enable a system to be constructed in which when a multi-stage inference is achieved, each time a cycle of an inference is finished, an evaluation value computing section attains an evaluation value of an intermediate inference result so as to complete the inference when the evaluation value satisfies a predetermined evaluation standard and in which consequently the user can describe inference rules without feeling any difficulty of a description of an end instruction to complete the inference at a satisfactory inference stage, thereby implementing a system which matches with the human ambiguity and which can be easily operated by the user.

BRIEF DESCRIPTION OF THE DRAWINGS

These and other objects and advantages of the present invention will become more fully apparent by reference to the following description and accompanying drawings wherein:

FIG. 5 is an explanatory diagram for explaining fuzzy numbers in an inference result;

FIG. 7 is an explanatory diagram for explaining an example of inference rules;

FIG. 9 is an explanatory diagram for explaining an example of inference rules;

FIG. 18 is an explanatory diagram useful to explain a fuzzy inference operation process associated with the FIG. 17 embodiment;

FIG. 20 is an explanatory diagram for explaining a fuzzy inference operation process in a first stage associated with the FIG. 19 embodiment;

FIG. 24 is a schematic diagram showing a description example of inference rules used in the embodiment of FIG. 23;

FIG. 28 is a schematic diagram showing a description example of inference rules used in the embodiment of FIG. 27;

FIG. 29 is a diagram showing a description example used in an evaluation computing section of the embodiment of FIG. 27;

FIG. 39 is an explanatory diagram useful to explain an example of a knowledge base;

FIG. 44 is a diagram showing a description example of inference rules used in the embodiment of FIG. 43;

DESCRIPTION OF THE PREFERRED EMBODIMENTS

An inference apparatus carries out an inference based on ambiguous knowledge. A description will be given of configurations or modes of carrying out the present invention by reference to the embodiments associated with various attached drawings.

Figure 1:
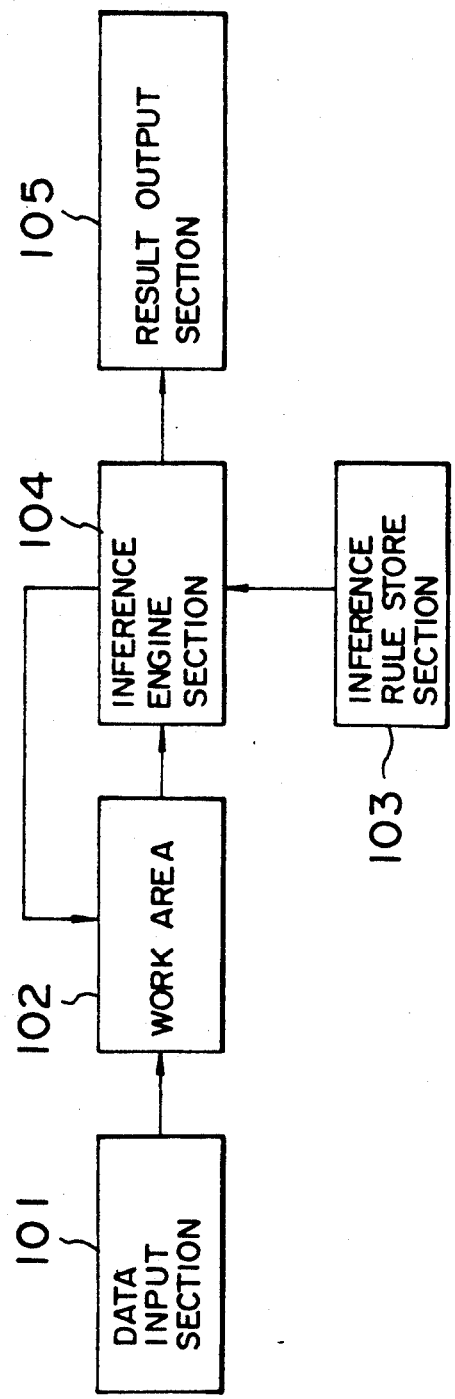
FIG. 1 is a configuration diagram of a conventional fuzzy inference apparatus.
Figure 2:
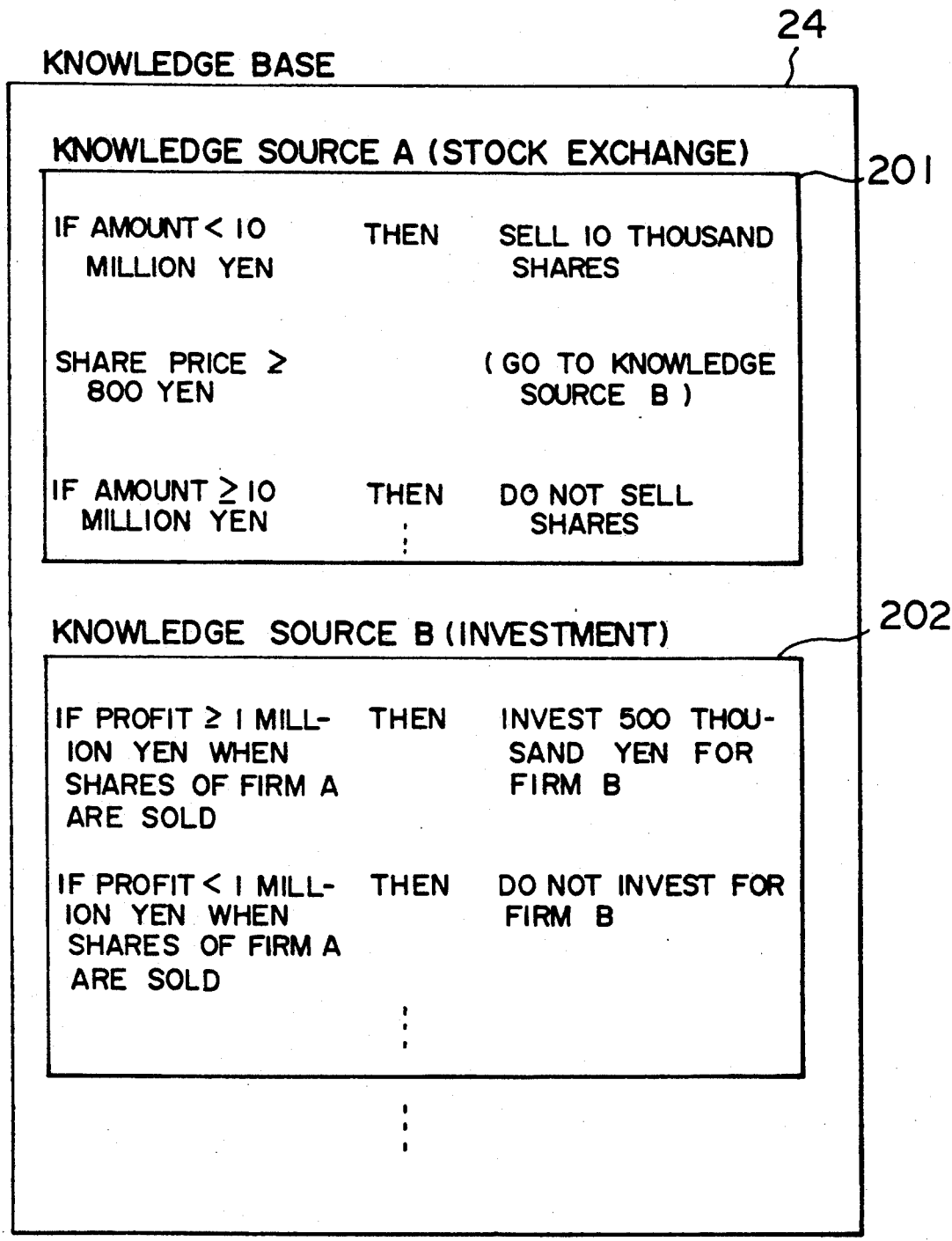
FIG. 2 is an explanatory diagram showing an example of a conventional knowledge base.
Figure 3:
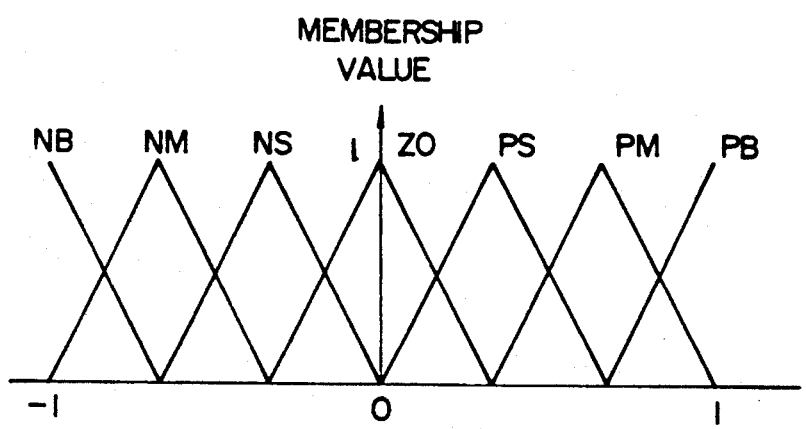
FIG. 3 is an explanatory diagram useful to explain fuzzy variables.
Figure 4:
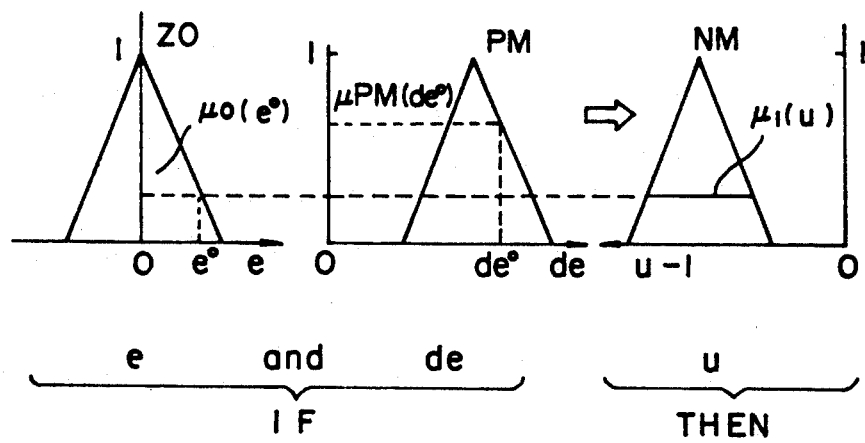
FIG. 4 is an explanatory diagram for explaining a fuzzy inference process based on inference rules.
Figure 6:
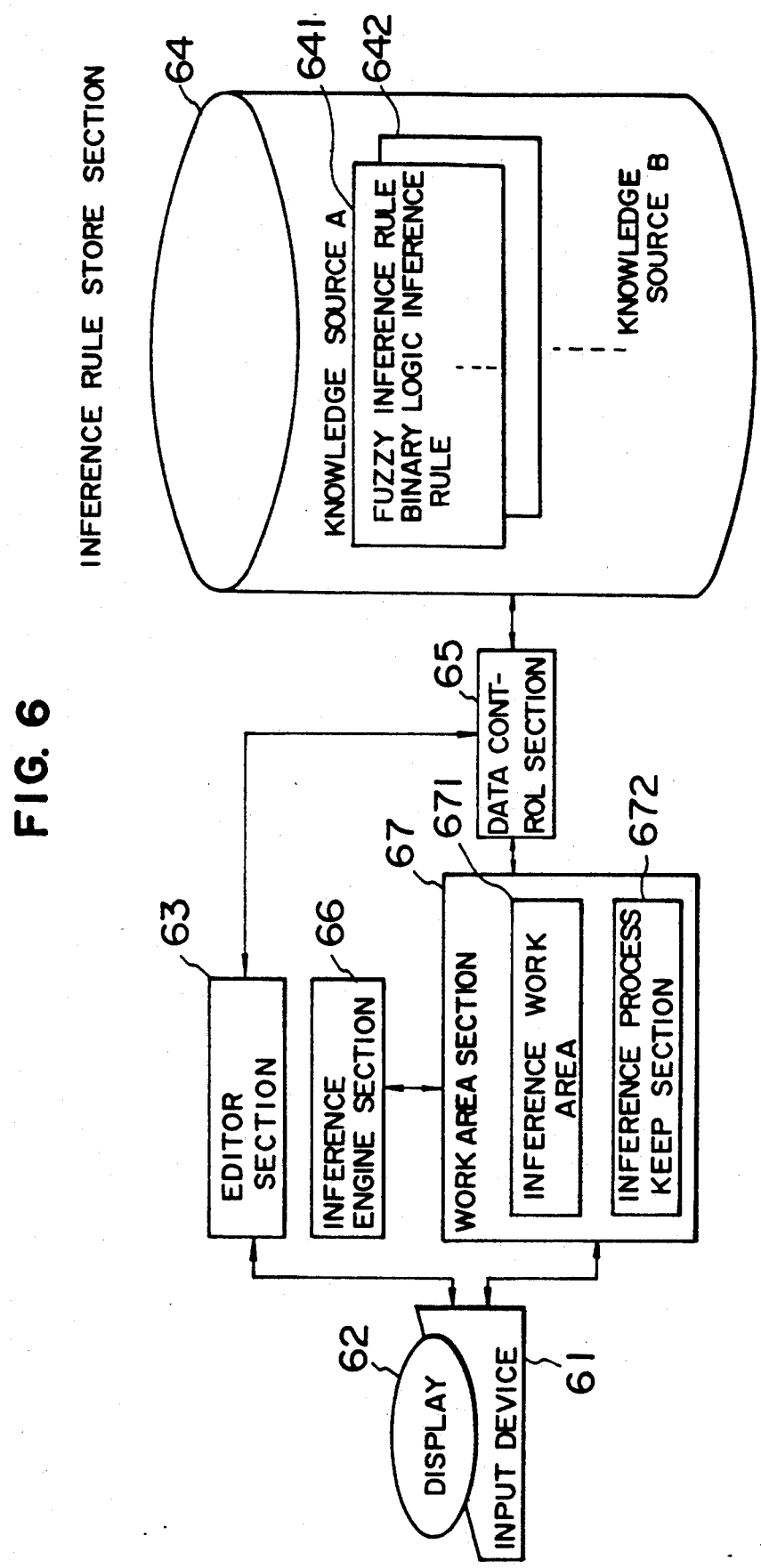
FIG. 6 is a configuration diagram of an embodiment including an inference rule storage.

First, various embodiments will be described including a mode of implementing the present invention based on the embodiments of FIGS. 6-9. FIG. 6 shows the configuration of an embodiment of an inference rule storage. In FIG. 6, the configuration includes a input device 61 which is used to input knowledge to an inference rule store section for storing therein production rules and to output an answer to a question issued from the system side in an inference process. A reference numeral 62 indicates a display for displaying thereon input values from the input device, inquiries from the system, intermediate and final results of an inference, and knowledge. A numeral 63 denotes an editor section for editing data of the inference rule store section. 64 stands for the inference rule store section in which production rules for which a fuzzy inference is possible and production rules for which an inference based on an ordinary binary logic is possible are contained. For example, a knowledge source 641 as a knowledge source A and a knowledge source 642 as another knowledge source B are stored therein. This section 64 contains a plurality of knowledge sources. In this connection, a production rule associated with a fuzzy inference denotes a rule including a condition field described with fuzzy numbers or in a representation of an ordinary binary logic and a conclusion field expressed with fuzzy numbers. A production rule to be executed in an ordinary expert system indicates a rule comprising a condition field described with fuzzy numbers or in a representation of an ordinary binary logic and a conclusion field expressed with an action (execution statement) in a binary logic representation. Reference numeral 65 is a data control section for retrieving from the inference rule store section 64 production rules related to a fuzzy inference or a binary logic inference. A numeral 66 designates an inference engine section which interprets a fact based on an input from a user to obtain an adaptation with respect to the production rules from the data control section 65 to produce a conclusion of the inference. If the result is an intermediate result which is not the final result necessary for the user, in order to attain a conclusion associated with the user's request, the inference engine section 66 presents knowledge of experts and various kinds of data items related to the expert knowledge. Numeral 67 indicates a work area section in which the production rules attained by the data control section 65 are stored and in which production rules associated with input value data from the user are checked to conduct an inference in an inference work area 671. However, when the production rules are associated with a binary logic inference, an action expression of a conclusion field determined to be adaptive in an inference is executed, whereas when the rules are related to a fuzzy inference, an inference result of all rules determined to be adaptive is stored in an inference process keep section 672.

Referring next to FIGS. 6 and 7, a description will be given in detail of an inference rule storage having an inference rule store section which is configured as described above and for which a fuzzy inference is possible in accordance with the present invention.

1) First, an expert inputs from the input device 61, while visually checking contents displayed on the display 62, production rules to be accumulated as knowledge. In this operation, an editing function of the editor section 63 is used so that the inputted knowledge data is stored in the inference rule store section 64 according to a data format set for the computer.

2) As for rule storing method, for each knowledge source, production rules of a fuzzy inference and a binary logic inference are stored. FIG. 7 shows an example of the rule storing method. This configuration includes a plurality of knowledge sources. In this example, the knowledge source A contains knowledge related to stock exchange or transactions. Each knowledge source includes entries. The entry comprises a rule number, a rule type such as a fuzzy rule (F) or a binary logic rule (A), an antecedent specifying a condition of the IF clause, and a consequent designating a result of the THEN clause. Furthermore, in a case of a binary logic rule, a subsequent knowledge source is denoted for the next inference. However, the knowledge source may be omitted. Incidentally, a fuzzy rule indicates a rule having a consequent represented with fuzzy variables, whereas a binary logic rule is a rule in which a consequent is expressed with an action. For example, rule number 1 is associated with a binary logic rule, which expresses "If the amount is less than ten million yen, sell ten thousand shares and notify the selling to Mr. A. After the inference, proceed to an investment knowledge source B."

3) After the expert completely inputs the knowledge, the system user inputs from the input device 61 response items such as "Yes", "No", and answers to questions which are issued from the system and which are displayed on the display 62.

4) Data supplied from the user is temporarily stored in the inference work area 671 of the work area section 67. The inference engine section 66 obtains via the data control section 65 a plurality of knowledge sources stored in the inference rule store section 64. The knowledge sources are then loaded in the inference work area 671 of the work area section 67.

5) The inference engine section 66 checks in the inference work are 671 the production rules adaptive to the input data from the user to conduct an inference. Based on production rules that are activated or fired, an inference result is obtained. The binary logic inference and the fuzzy inference are simultaneously employed. In a fuzzy inference, when the antecedent is not represented with fuzzy numbers, the adaptation degree thereof is set as 0 or 1 so as to carry out an ordinary fuzzy inference based on all fuzzy rules. An inference result is written in the inference process keep section 672. In a binary logic inference, when the antecedent is not represented with fuzzy numbers, the adaptation degree thereof is set as 0 or 1 so as to execute, for example, a rule having the highest adaptation degree. As a result, an action expression of the consequent of the optimal rule is executed. If the binary logic inference rule that is activated or fired is associated with a knowledge source to be next created, the knowledge source is obtained. Otherwise, a knowledge base specified as the final item is generated, for example, in an entry of number 100 of FIG. 7, a generation (NK) of a knowledge source is indicated, namely, a knowledge base B is to be created.

However, when the knowledge source field is blank, the knowledge source is not created.

6) After the inference, if the obtained result is the final result of the problem for the user, the inference mechanism section 66 displays as the final result the content of the inference process keep section 672 on the display 62. When the result is an intermediate result, the inference mechanism section 66 displays the next enquiry item on the display 62, thereby issuing a question to the user. By repeatedly conducting a multi-stage inference through the sequence of operations above, the system obtains the final result necessary for the user. The result is then displayed on the display 62.

However, the fuzzy inference here may be conducted through inference procedures, for example, the Max-Min operations employed in the "Fuzzy Control" described in pages 442 to 446 of the "System and Control", Vol. 28, No. 7 (1984).

Figure 8:
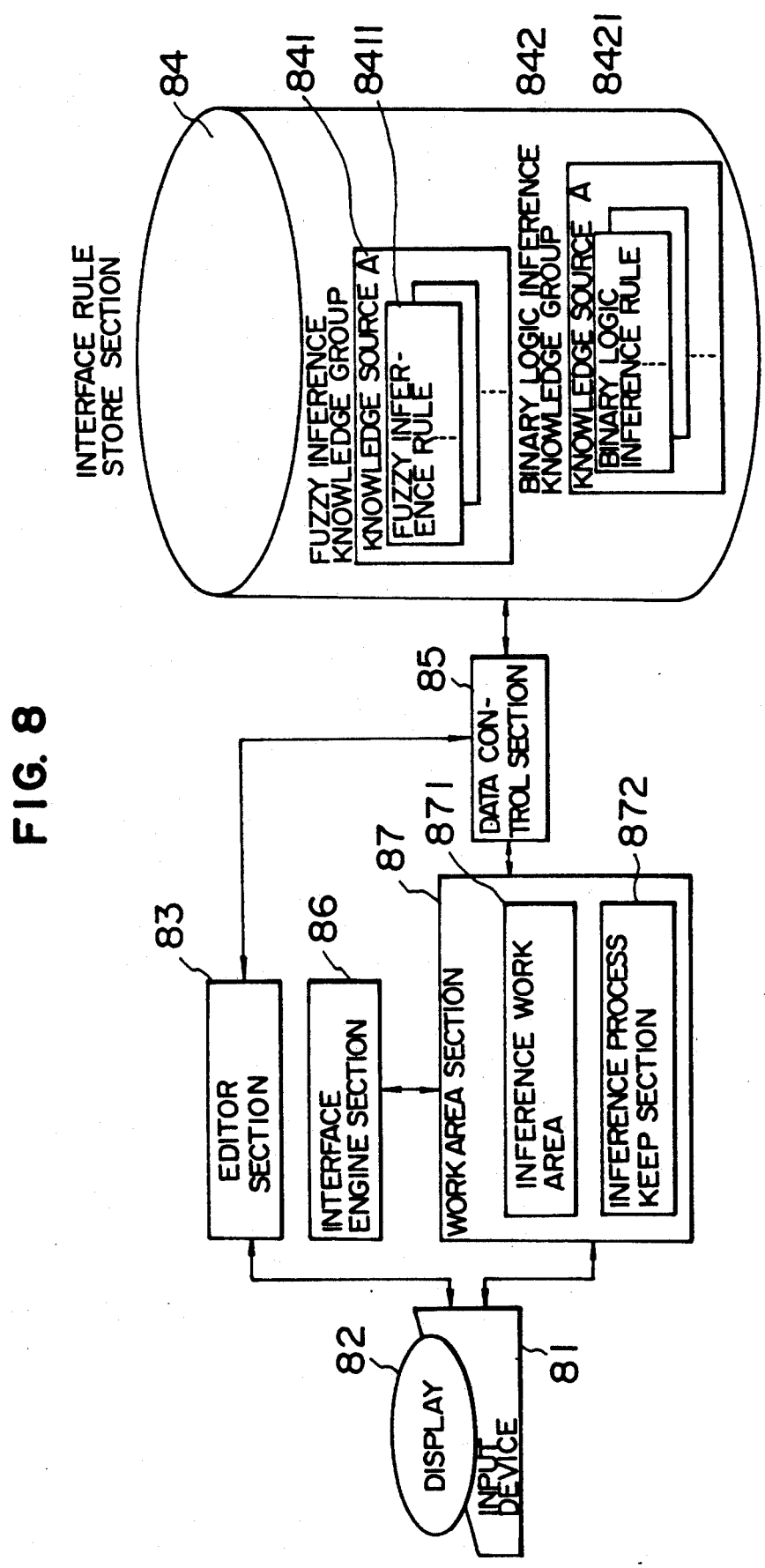
FIG. 8 is a configuration diagram of an embodiment including an inference rule storage.

Referring next to FIG. 8, a description will be given of an embodiment of the inference rule storage having the inference rule storage section for the fuzzy inference. The structure of FIG. 8 comprises an input device 81 which is used to input knowledge to the inference rule store section accumulating production rules and to send an answer to a question from the system side during an inference process. Reference numeral 82 is a display for displaying thereon input values from the input device 81, questions, intermediate inference results, and final results from the system, and knowledge. Numeral 83 stands for an editor section to edit data items of the inference rule store section. Numeral 84 is the inference rule store section for storing therein groups of rules including production rules associated with the fuzzy inference and production rules to be executed in an expert system in which an ordinary binary logic inference is possible. The groups of rules constitute knowledge sources. The knowledge sources comprise a fuzzy inference knowledge source group 841 including the condition field of the rule described with fuzzy numbers or in an ordinary binary logic representation and the conclusion field expressed with fuzzy numbers and a binary logic inference knowledge source group 842 including the condition field of the rule described with fuzzy numbers or in an ordinary binary logic representation and the conclusion field expressed with an action in the binary logic. Each fuzzy inference knowledge source group is constituted with a plurality of knowledge sources such as a knowledge source 8411 associated with fuzzy inference rules, whereas each binary logic inference knowledge group comprises a plurality of knowledge sources such as a knowledge source 8421 related to binary logic inference rules. Reference numeral 85 denotes a data control section which obtains production rules of fuzzy or binary logic inferences from the inference rule store section 84. Numeral 86 indicates an inference mechanism section which interprets a fact associated with an input from the user to obtain an inference result based on an adaptation with respect to the production rules from the data control section 85. When the result is not the final result for the user but an intermediate result, this section 86 presents expert knowledge and various data related therewith to obtain conclusion based on a request from the user. Numeral 87 denotes a work area section in which production rules attained by the data control section 85 is loaded so that the system determines production rules related to input value data from the user to carry out an inference in an inference work area 871. However, when the production rules are associated with the binary logic inference, the system executes the action representation in the conclusion field of the adaptive rule. When the rules relate to the fuzzy inference, the system produces inference results of all rules determined to be adaptive. The results are then stored in an inference process keep section 872.

Referring next to FIGS. 8 and 9, a description will be given in more detail of the inference rule storage having the inference rule store section for which the fuzzy inference is possible in accordance with the present invention.

1) Production rules of experts are inputted to the system by use of the input device 81, the display 82, and the editor section 83. The knowledge data thus supplied is stored in the inference rule store section 84 in accordance with the data format beforehand established.

2) When storing knowledge, the system classifies the knowledge into fuzzy and binary logic inference knowledge groups. Each knowledge group includes a plurality of knowledge sources respectively comprising production rules. FIG. 9 shows an example of the knowledge storing method. In this case, the fuzzy inference knowledge group includes a knowledge source A in which knowledge related to stock exchange is accumulated. The knowledge source includes entries each comprising a rule number, an antecedent describing a condition of the IF clause, and a consequent specifying a result of the THEN clause. Moreover, an occurrence of a knowledge source for the subsequent inference is specified by a knowledge source with a number NK for all rules for the fuzzy inference knowledge group. In contrast thereto, for the binary logic knowledge group, a knowledge source is specified for each rule.

3) After the knowledge is completely stored as described above, in response to enquiry items displayed from the system side on the display 82, the system user inputs answers from the input device 81.

4) Data supplied from the user is temporarily stored in the inference work area 871 of the work area section 87. The inference engine section 86 obtains via the data control section 85 a plurality of knowledge sources stored in the inference rule store section 84. The knowledge sources are then loaded in the inference work area 871 of the work area section 87.

5) The inference engine section 86 checks in the inference work area 871 the production rules adaptive to the input data from the user to conduct an inference, thereby obtaining an inference result. The binary logic inference and the fuzzy inference are executed in an arbitrary order. For the fuzzy inference knowledge group, when the antecedent is not represented with fuzzy numbers, the adaptation degree thereof is set as 0 or 1 so as to carry out an ordinary fuzzy inference based on all fuzzy rules. An inference result is written in the inference process keep section 872. An instruction statement described with a number NK is then executed to generate a knowledge source. In the example of FIG. 9, a knowledge source A of the binary logic inference knowledge group (A) is generated. For the binary logic inference knowledge group, when the antecedent is not represented with fuzzy numbers, the adaptation degree thereof is set as 0 or 1 so as to execute, for example, a rule having the highest adaptation degree. As a result, an action expression of the consequent of the optimal rule is executed. If the binary logic inference rule that is activated or fired is associated with creation of a knowledge source, the system generates the next knowledge source.

6) After the result is attained, if the obtained result is the final result of the problem for the user, the inference mechanism section 86 displays as the final result the content of the inference process keep section 872 on the display 82. When the result is an intermediate result, the inference mechanism section 86 displays the next enquiry item on the display 82, thereby issuing a question to the user. By repeatedly conducting a multi-stage inference through the sequence of operations described above, the system obtains the final result necessary for the user. The result is then displayed on the display 82.

As described above, according to the embodiment above, in order for the system user to handle fuzzy or ambiguous input values, the inference rule store section can be loaded with fuzzy inference production rules as well as production rules of the conventional expert system at the same time. In accordance with the present invention, since the user can describe rules in which ambiguous human expressions are included, an inference rule storage satisfactorily matching the human senses can be configured.

Figure 10:
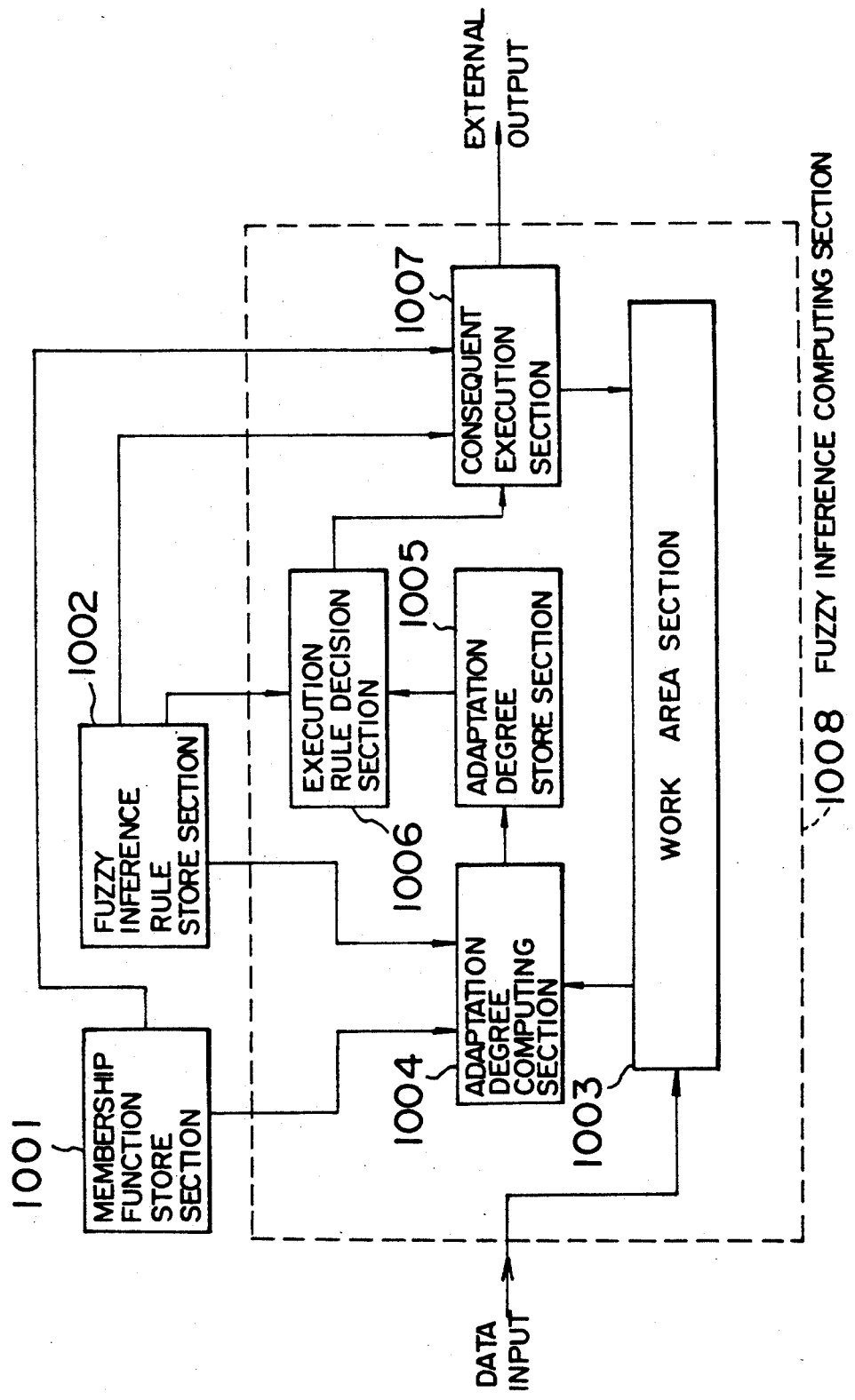
FIG. 10 is a configuration diagram of an embodiment including an inference rule storage.

Next, a description will be given of another embodiment. Configurations or modes of configuring such embodiment will be described by reference to FIGS. 10-16. The constitution of FIG. 10 includes a membership function store section 1001 for storing therein contour data of membership functions to be used for inferences, a fuzzy inference rule store section 1002 for storing fuzzy inference rules in the if—then—format and execution priority orders thereof, a work area section 1003 for storing intermediate results and initial values of inferences, an adaptation degree computing section 1004 for computing adaptation degrees between the contents of the work area section 1003 and the inference rules stored in the inference rule store section 1002, an adaptation degree store section 1005 for storing the adaptation degrees of the respective inference rules obtained in the adaptation degree computing section 1004, an execution decision section 1006 for selecting inference rules having an adaptation degree exceeding a predetermined value and for determining an inference rule thereamong having the highest execution priority order, a consequent executing section 1007 for executing the consequent of the inference rule determined in the execution rule decision section 1006, and a fuzzy inference computing section 1008 constituted with the work area section 1003, the adaptation degree computing section 1004, the adaptation degree store section 1005, the execution rule decision section 1006, and the consequent executing section 1007.

A description will now be given of the operation of an inference rule selector in the embodiment thus configured.

The fuzzy inference rule store section 1002 is loaded, for two input variables $x_1$ and $x_2$, with n inference rules as follows.

$R_1: \text{If}(x_1 \text{ is } A_{11}) \text{ and } (x_2 \text{ is } A_{12}) \text{ then action (1): } P=1$ $R_2: \text{If}(x_1 \text{ is } A_{21}) \text{ and } (x_2 \text{ is } A_{22}) \text{ then action (2): } P=3$ $R_3: \text{If}(x_1 \text{ is } A_{31}) \text{ and } (x_2 \text{ is } A_{32}) \text{ then action (3): } P=2$ $R_n: \text{If}(x_1 \text{ is } A_{n1}) \text{ and } (x_2 \text{ is } A_{n2}) \text{ then action (n): } P=m$ where action (1) to action (n) respectively designate confirmative or determinant operations such as "Write values in the work area section" and "Turn motor switch on" and P stands for an execution priority order of the inference rule. The value of P is an integer not less than one. For the greater value of P, the higher execution priority order is assigned to the inference rule. Contours of the membership functions associated with $A_{11}$ to $A_{n2}$ are stored in the membership function store section 1001.

Figure 11:
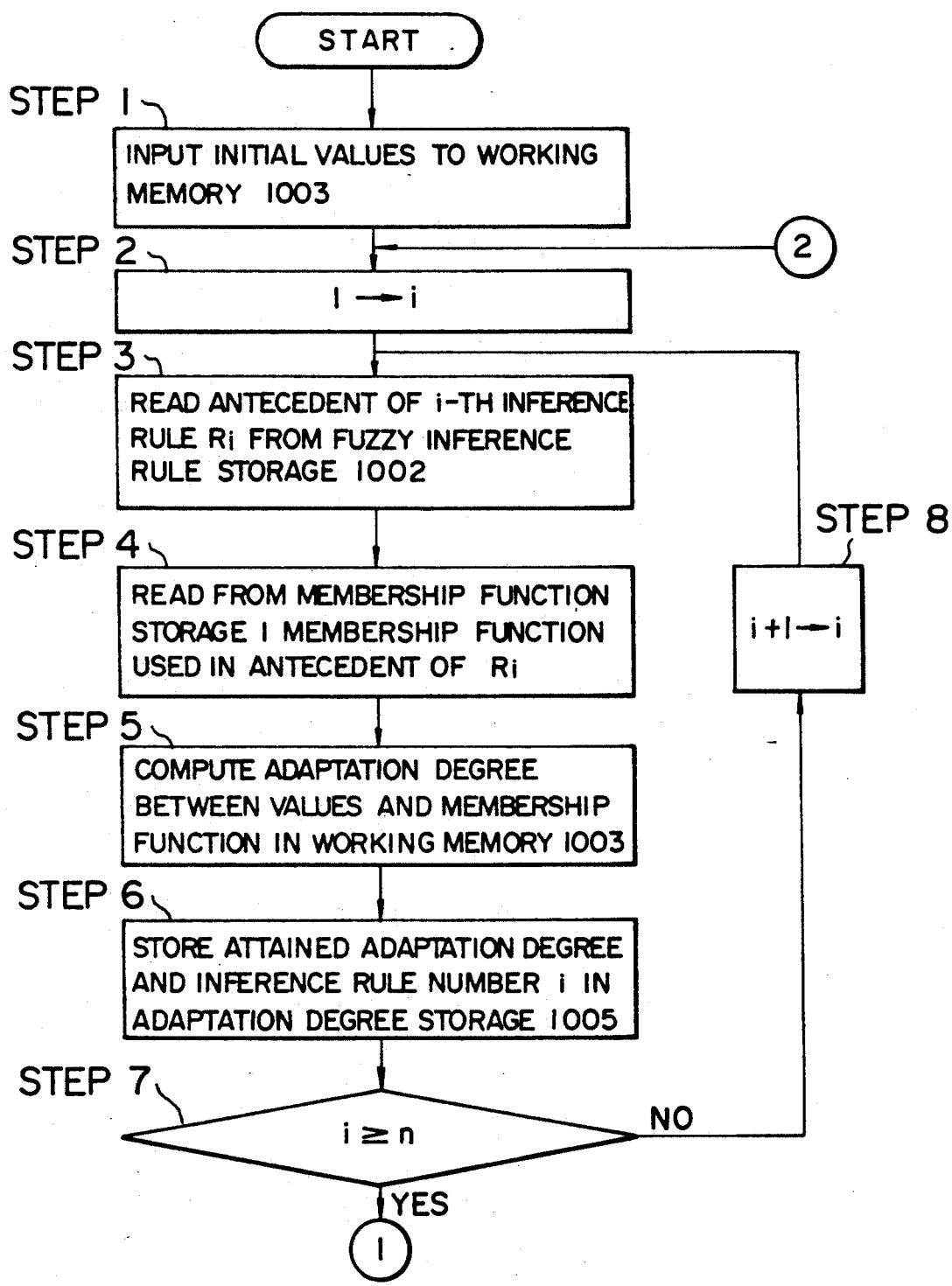
FIGS. 11 and 12 are flowcharts useful to explain the embodiment of FIG. 10.
Figures 12, 13:
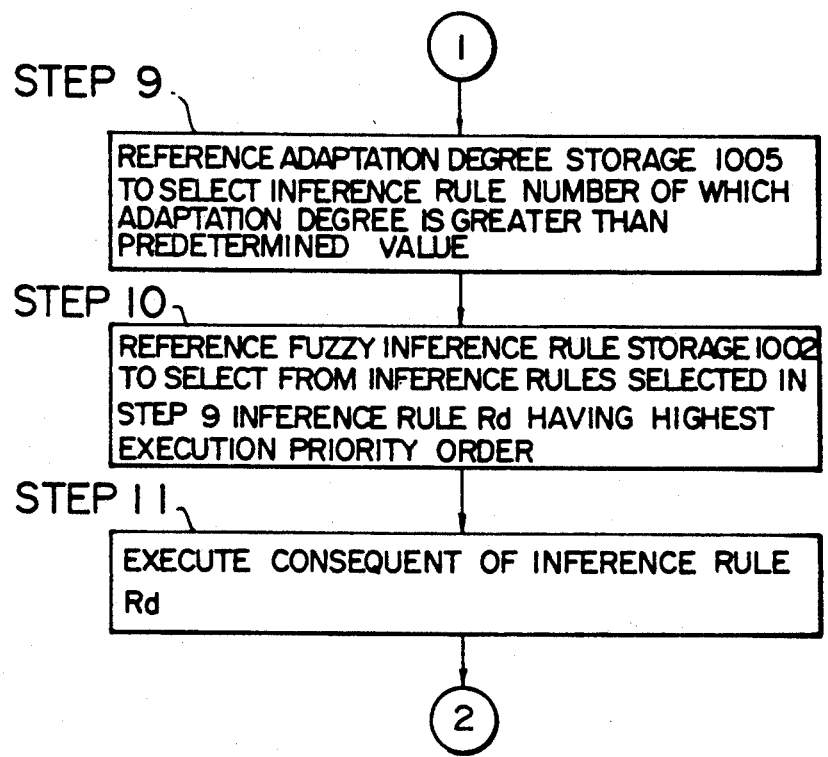
FIG. 13 is a diagram showing a layout of data stored in a membership function store section 1001.

In the setting operation, an inference is conducted in accordance with steps 1 to 11 of the flowcharts of FIGS. 11 and 12. The operation will next be described with reference to the flowcharts.

In the step 1, for the system initialization, initial values are supplied to the work area section 1003 to initialize an inference.

In the step 2, 1 is assigned to a variable i indicated by an inference rule number.

In the step 3, in order for the adaptation degree computing section 1004 to compute an adaptation degree between a content of the work area section and an antecedent of the inference rule, a label of a membership function contained in the antecedent of the fuzzy inference rule having the inference rule number i is read from the fuzzy inference rule store section 1002.

In the step 4, contour data of a membership function associated with the label obtained in the step 3 is read from the membership function store section 1001. This section 1001 comprises a memory in which membership functions are stored in a form of a numeric value table as shown in FIG. 13. In this table, items arranged in the horizontal row denote elements of a set of variables $x_1$ and items in the vertical column designate labels of membership functions. Values of this table indicate grade values of membership functions. Each value is represented with a real number ranging from 0 to 1. Similarly, a numeric value table related to a variable $x_2$ is also stored in this section 1001.

The step 5 computes an adaptation degree based on the values in the work area section 1003 and the membership functions obtained in the step 4. Assuming that the membership functions read in the step 4 are $A_{i1}$ and $A_{i2}$ and that the latest values of the variables $x_1$ and $x_2$ in the work area section 1003 are respectively $x_1^1$ and $x_2^1$, the adaptation degree $w_i$ of the inference rule is computed from the following expression.

$$w_i = A_{i1}(x_1^1) \wedge A_{i2}(x_1^1)$$

The step 6 stores the adaptation degree $w_i$ thus attained and the inference rule number i in the adaptation degree store section 1005.

The step 7 compares the inference rule number i with an inference rule count n. When i is less than n, the adaptation degree computation has not been conducted for all inference rules. Consequently, the step 8 increments the value of i by one and then passes control to the step 3.

Processing from the step 3 to the step 6 is repeatedly achieved until a condition i>n is satisfied. When this condition is satisfied, for all the values in the work area section 1003, the adaptation degrees are obtained for all inference rules associated with the values, which are stored in the adaptation degree storage 1005.

In the step 9, the adaptation degrees which are loaded in the adaptation degree store section 1005 and which do not exceed a predetermined value t are deleted to determine inference rule numbers having an adaptation degree exceeding the predetermined value t. The value t is set as $0 \leq t \leq 1$ before the inference is started.

The step 10 accesses the fuzzy rule store section 1002 to select from the inference rules obtained in the step 9 an inference rule $R_d$ having the highest execution priority order. The steps 9 and 10 are executed in the execution rule decision section 1006.

In the step 11, the consequent of the inference rule $R_d$ obtained in the step 10 is read from the fuzzy inference rule store section 1002. The consequent is then executed. As a result, the content of the work area section 1003 is rewritten and/or a control operation quantity is outputted to an external system.

After the step 11 is executed, control proceeds to the step 2 to execute again the processing from the step 2 to the step 11.

According to the embodiment as described above, owing to provisions of the fuzzy inference rule store section 1002 to store therein inference rules and execution priority orders thereof and the execution rule decision section 1006 to obtain from the inference rules having an adaptation degree exceeding the predetermined value t an inference rule having the highest execution priority order, the user can directly specify priority levels (execution priority orders) of inferences. As a result, even when a consequent is described with a determinant action, contentions between inference rules are avoided and hence an optimal inference rule can be executed.

Incidentally, this embodiment has been described with reference to a case in which the consequent includes only a determinant action; however, an action in which fuzzy variables are handled may also be included.

Figure 14:
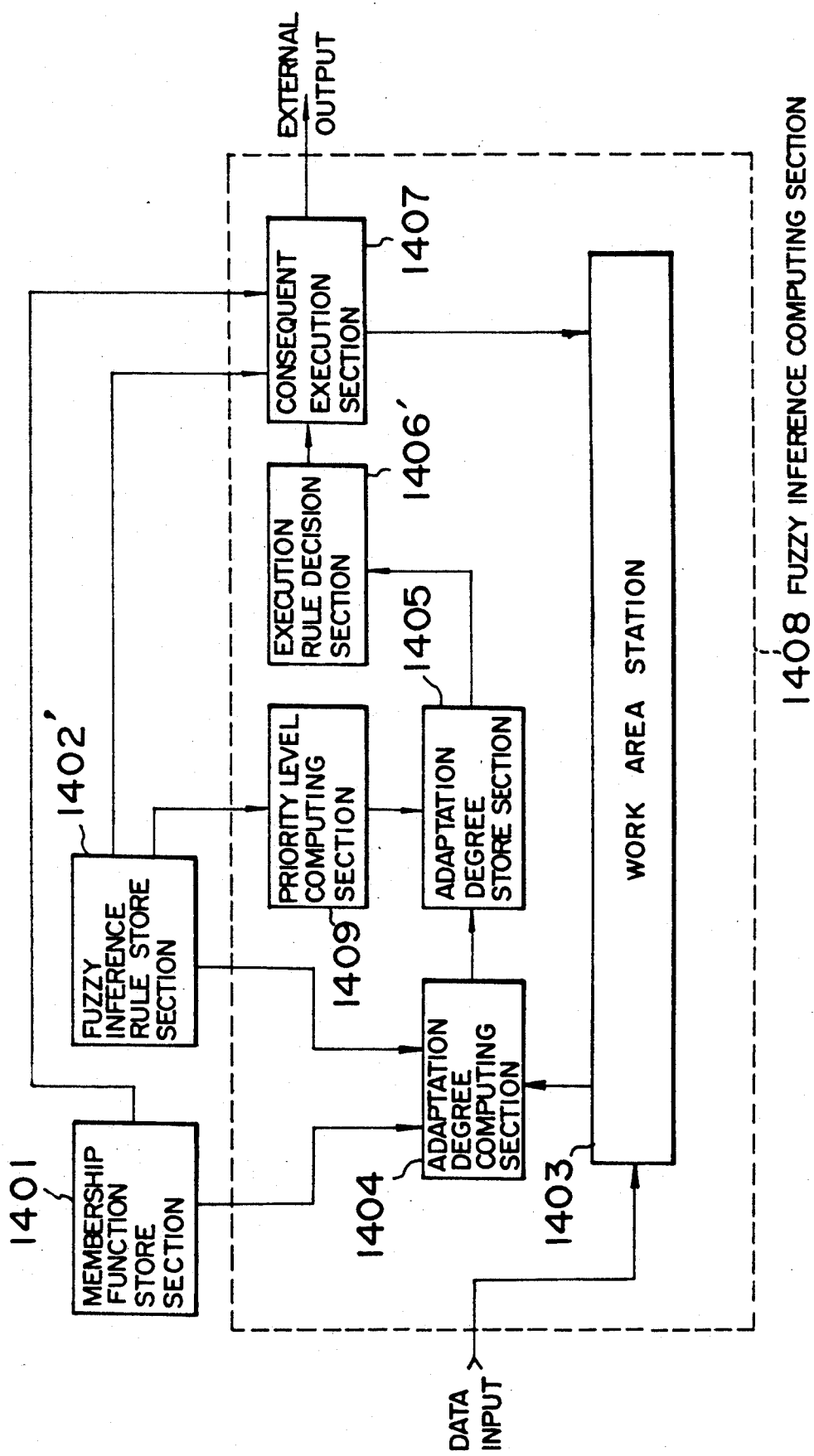
FIG. 14 is a configuration diagram of an embodiment including an inference selecting device.

Referring next to FIG. 14, a description will be given of an embodiment of an inference rule selector in accordance with the present invention. FIG. 14 shows a configuration diagram of an inference rule selector as an embodiment in accordance with the second invention. This configuration includes a membership function store section 1401 storing therein contour data of membership functions to be used for inferences, a work area section 1043 storing therein intermediate results and initial values of inferences, an adaptation degree computing section 1404 to compute an adaptation degree between a content of the work area section 1403 and inference rules, an adaptation degree store section 1405 to store therein adaptation degrees of the respective inference rules attained in the adaptation degree computing section 1404, and a consequent execution section 1407 to execute the consequent of an inference rule determined by an execution rule decision section 1406'. The constituent components above are similar in configuration to those of FIG. 10. The constitution of FIG. 14 is different from that of FIG. 10 in that the fuzzy inference rule store section 1002 is replaced with a fuzzy inference rule store section 1402' storing therein fuzzy inference rules in the if—then—format and conviction degrees, a priority level or order computing section 1409 is provided to compute an adaptation degree of each inference rule stored in the adaptation degree store section 1405 and the conviction degrees stored in the fuzzy inference rule store section 1402', and the execution rule decision section 1006 is replaced with an execution rule decision section 1406' to select an inference rule having the highest priority order based on the computation results from the priority order computing section 1409.

Referring now to the flowcharts of FIGS. 15 and 16, a description will be given of the operation of the inference rule selector of the embodiment configured as described above.

The fuzzy inference rule store section 14021 is loaded with n inference rules as follows.

$R_1$:If($x_1$ is $A_{11}$) and ($x_2$ is $A_{12}$) then action (1): $f_1 = 0.1$ $R_1$:If($x_1$ is $A_{21}$) and ($x_2$ is $A_{22}$) then action (2): $f_2 = 0.7$ $R_3$:If($x_1$ is $A_{31}$) and ($x_2$ is $A_{32}$) then action (3): $f_3 = 0.2$ $R_n$:If($x_1$ is $A_{n1}$) and ($x_2$ is $A_{n2}$) then action (n):
$f_n = 0.8$, where action (1) to action (n) respectively indicate confirmative or determinant operations and $f_n$ denotes a conviction degree for an inference rule. The value of $f_n$ is a real number ranging from 0 to 1. For the greater value of $f_n$, the higher priority order or level is assigned to the inference rule. Contour data items of the membership functions associated with $A_{11}$ to $A_{n2}$ are stored in the membership function store section 1401.

Figure 15:
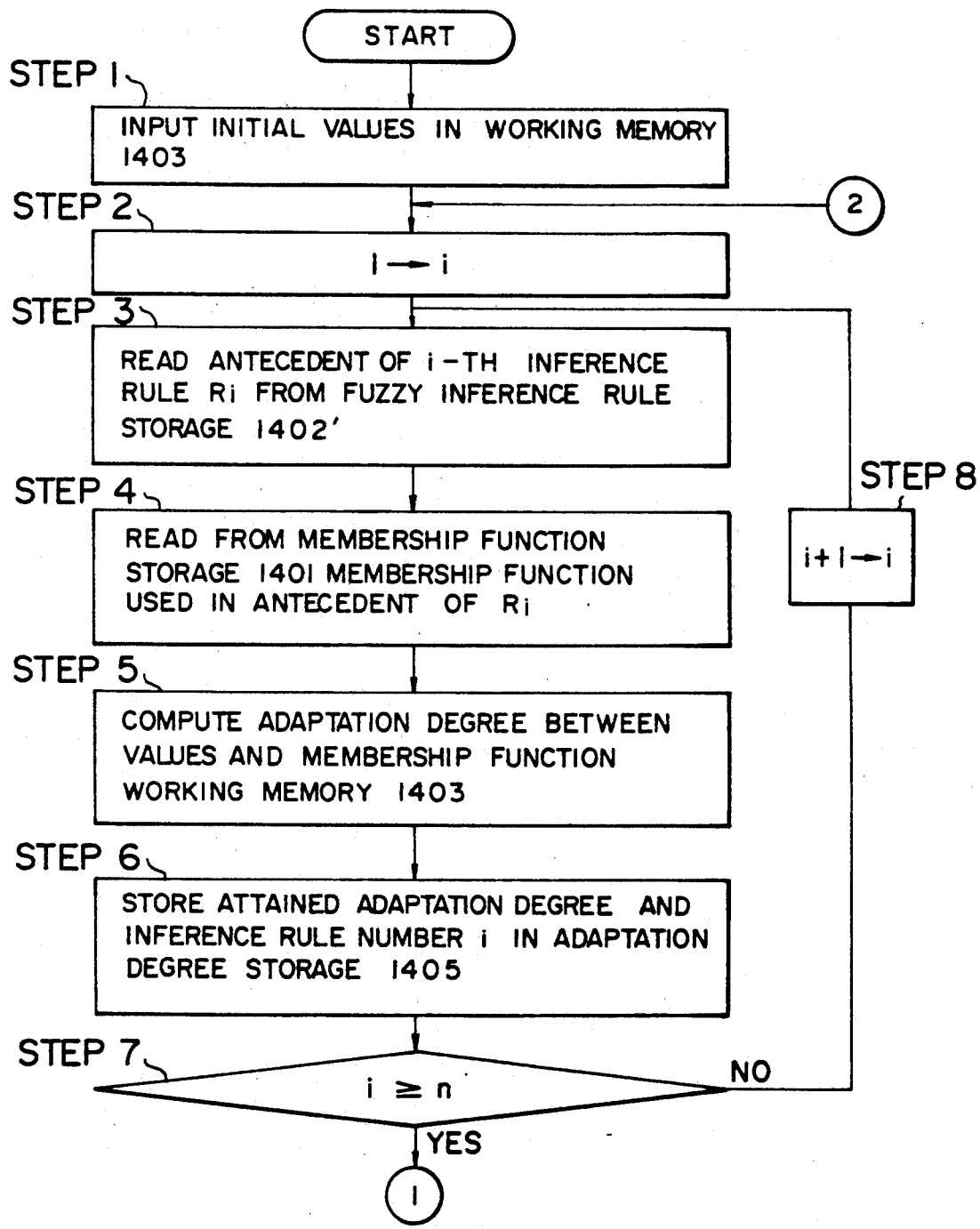
FIGS. 15 and 16 are flowcharts useful to explain the embodiment of FIG. 14.
Figure 16:
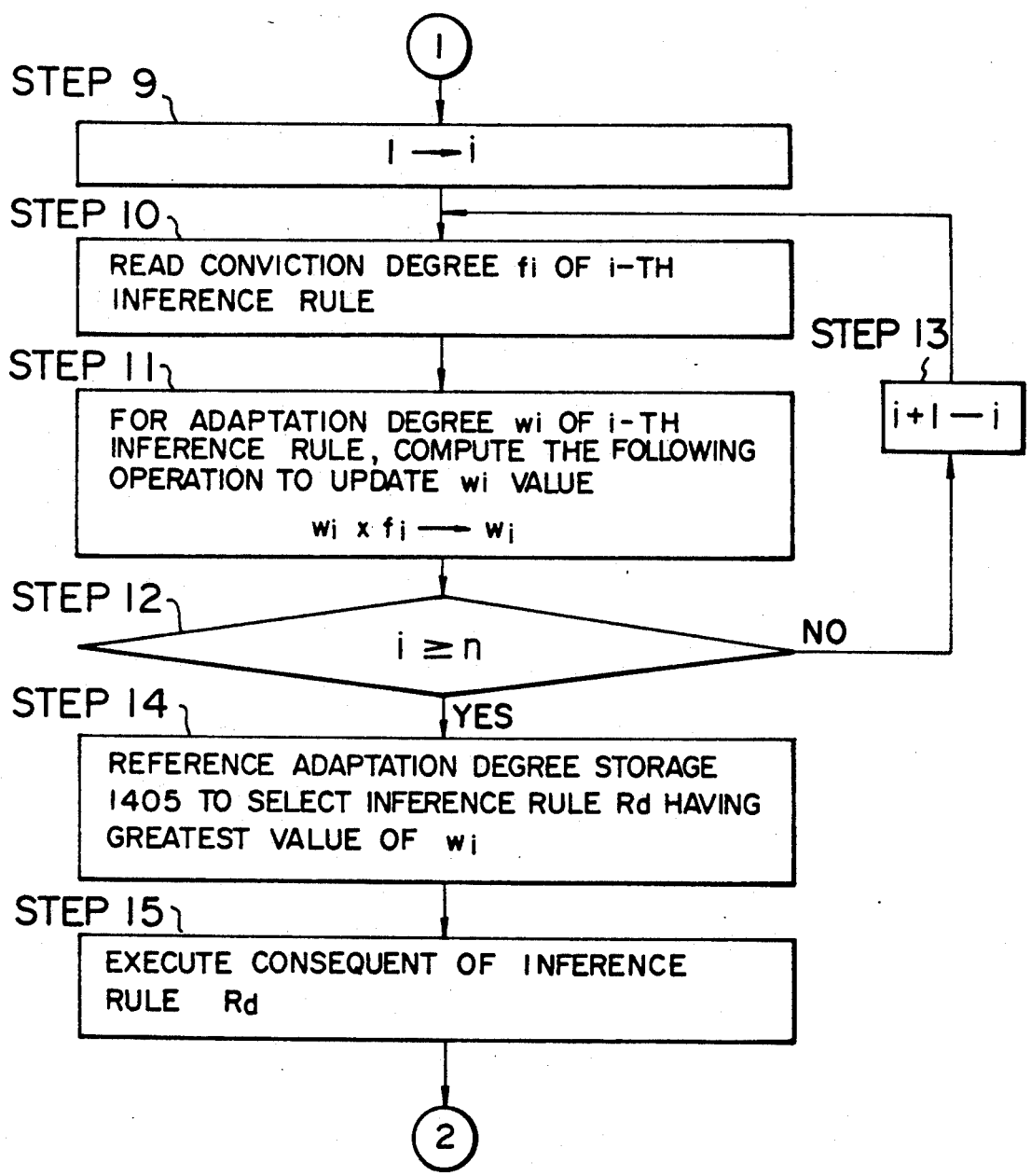

From a step 1 to a step 8 of FIG. 15, this system carries out an operation similar to the operation of the embodiment discussed above. In this operation, adaptation degrees are computed for the respective inference rules based on the data in the work area section 1403. The adaptation degree values are stored in the adaptation degree store section 1405.

In a step 9, the inference rule number i is initialized to one.

In a step 10, for a computation of a priority order in a step 11, a conviction degree $f_i$ of the i-th fuzzy inference rule is read from the fuzzy inference rule store section 1402'.

In the step 11, the adaptation degree $w_i$ of the i-th inference rule stored in the adaptation degree store section 1405 is updated to the value (priority degree) as follows.

$$w_i \leftarrow (w_i * f_i)$$

In a step 12, the inference rule number i is compared with the inference rule count n. For i<n, control proceeds to a step 13 in which the value i is incremented by one. Thereafter, control is returned to the step 10. Through this operation, the computation of the above expression is conducted for the adaptation degrees of all inference rules. The computation from the step 9 to the step 13 is executed in the priority degree computing section 1409.

In a step 14, the execution rule decision section 1406' references the adaptation degree store section 1405 to determine an inference rule $R_d$ having the highest $w_i$ value.

A step 15 reads the consequent of the inference rule $R_d$ from the fuzzy inference rule store section 1402'. The consequent is then executed. As a result, the content of the work area section 1403 is rewritten and/or a control operation quantity is outputted to an external system.

After the step 15 is executed, control proceeds to the step 2 to execute again the processing from the step 2 to the step 15.

According to the embodiment as described above, owing to provisions of the fuzzy inference rule store section 1402' to store therein inference rules and execution priority orders thereof, the priority order computing section 1408 to compute adaptation degrees and conviction degrees of the respective inference rules and to determine priority orders, and the execution rule decision section 1406' to obtain an inference rule having the highest execution priority order, the user can clearly specify execution priority orders (conviction degrees) of inference rules. As a result, even when a consequent is described with a confirmative or determinant action, contentions between inference rules are avoided and hence an optimal inference rule can be executed.

Incidentally, this embodiment has been described with reference to a case in which the consequent includes only a determinant action; however, an action in which fuzzy variables are handled may also be included.

Figure 17:
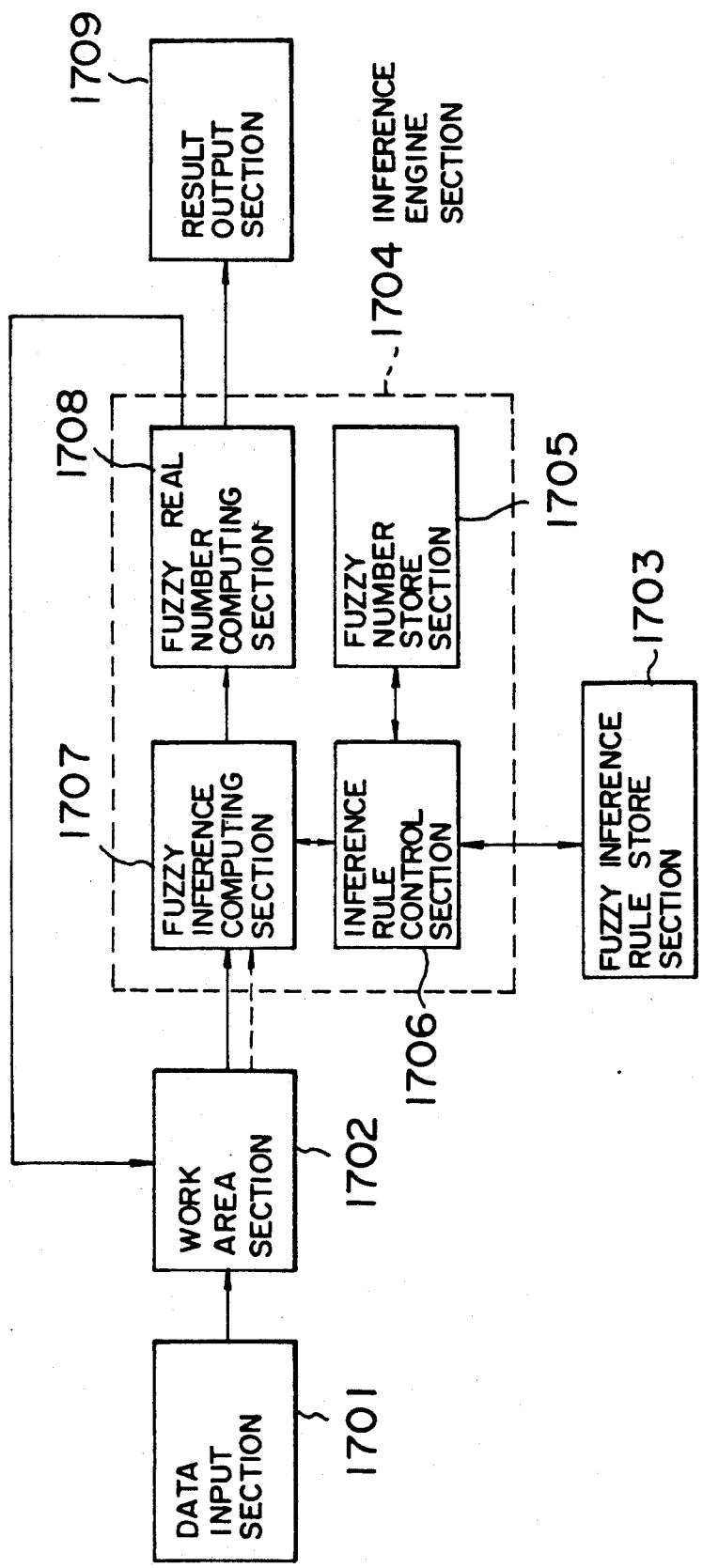
FIG. 17 is a configuration diagram of an embodiment including an intermediate result decision device.

A description will next be given of another embodiment in accordance with the present invention. Configurations or modes of embodying such embodiment will be described by referring to FIGS. 17-22. FIG. 17 is a configuration diagram of this embodiment. This system includes a data input section 1701 for inputting therefrom real values attained from a sensor and the like, a work area section 1702 to store therein data from the data input section 1701 and/or intermediate inference results, and a fuzzy inference rule store section 1703 to store therein a plurality of inference rules for fuzzy inferences. Each rule is represented in the format of "IF—(antecedent)—THEN—(consequent)". The antecedent is an inference proposition or statement including fuzzy variables and the consequent is expressed with an ordinary function including real numbers. The configuration further comprises an inference mechanism section 1704 including a fuzzy number store section 1705 for storing therein fuzzy variables such as "Negative Big", "Zero", and "Positive Small" representing relationships in magnitude of control quantities, an inference rule control section 1706 to attain inference rules from the fuzzy inference computing section 1907 to conduct a fuzzy inference in association with inference rules by use of the initial data or the intermediate inference data from the work area section 1902 and to attain an inference result, and a fuzzy real number computing section 1908 for converting fuzzy numbers of the inference result into real numbers. At an intermediate point of an inference, the converted real numbers are stored as intermediate variables in the work area section 1902. The inference mechanism section 1904 conducts the next inference. Upon completion of the inference, the attained real values are supplied as an inference result to a result output section 1909.

Referring now to FIG. 18, a description will be given of the operation of the fuzzy multi-stage inference in the constitution thus configured in accordance with the present invention. Let us consider a case where a first-stage inference is conducted to attain a strength of braking force (BR) to be applied when a car is running at a speed (CS) 60 Km/h with a car interval (CL) 30 meters at time t. Subsequently, an inference is achieved at time t+1 to determine an intensity of a warning tone to be issued to passengers by means of a voice synthesizer or the like.

The fuzzy inference rule store section 1903 is loaded with a knowledge base 1 containing relationships between CL, CS, and BR in two rules as follows.

$R_1$: IF CL is Small(PS) And CS is Big(PB) THEN BR is Big (PB)

$R_2$: IF CL is Big(PB) And CS is Small(PS) THEN BR is Small(PS)

In the first-stage inference, the inference rule control section 1706 obtains the knowledge base 1 from the fuzzy inference rule store section 1703. The fuzzy inference computing section 1707 then conducts a min operation on the initial value data items (CL=30m and CS=60 Km/h) based on the expression (1). Namely, for the respective rules, the adaptation degrees of the antecedent and the consequent are computed. The results are combined through a max operation based on the expression (2) to obtain an inference result $T_1$. Although the result $T_1$ may be directly passed as an intermediate result to the next inference, two problems arise as follows.

1: Since the initial data of the fuzzy inference computing section 1707 are real values, an inference configuration associated with a real value input is necessary. On the other hand, since the intermediate result is supplied in the form of fuzzy numbers, an inference configuration for the fuzzy number input is required for the fuzzy inference computing section 1707. This consequently complicates the configuration of this section 1707.

2: When an intermediate result represented with fuzzy numbers is transferred through many stages, since the max operation is employed in the inference, the height of the fuzzy numbers in the inference result is decreased and the width thereof is increased. This results in an inference different from the actual facts.

In order to overcome this difficulty, the fuzzy real number computing section 1708 computes a mass of gravity of the inference result $T_1$ based on the expression (3). The obtained real value $U_1^*$ is stored as an intermediate result in the work area section 1702. Naturally, a height method may be employed to use the fuzzy number having the greatest height in the inference. In the second-stage inference, the inference rule control section 1706 obtains the following rules stored in a knowledge base 2 in the fuzzy inference rule store section 1703.

R1: IF BR is Small(PS) THEN AL is Small(PS)

R2: IF BR is Medium (PM) THEN AL is Medium (PM)

R1: IF BR is Big(PB) THEN AL is Big (PB)

Subsequently, the fuzzy inference computing section 1707 receives the intermediate result $u_1^*$ to conduct an inference similar to the first-stage inference, thereby obtaining an inference result $T_2$ as a fuzzy number. The number is supplied to the fuzzy real number computing section 1708 to be converted into a real value $u_2^*$. The value $u_2^*$ is sent to a voice synthesizer, which in turn sounds a warning tone to passengers. In this fashion, the third-stage and subsequent inferences are similarly conducted to accomplish the multi-stage inference.

In the example of the invention related to FIGS. 17 and 18, the second-stage inference employs only an intermediate result. However, as indicated with a broken line in association with the work area 1702 and the fuzzy inference computing section 1707 in FIG. 17 as an invention associated with FIG. 17, the input data at time t+1 may be used together with the intermediate inference result for the inference. Since other configurations are the same as those of the invention associated with FIGS. 17 and 18, a redundant detailed description thereof will be avoided. In this constitution, a result of an inference achieved by use of preceding data and the current input data can be employed for a multi-stage inference. In consequence, this configuration is quite suitable when a learning process and a forecasting operation are involved.

Next, referring to FIG. 19, a description will be given of an embodiment of an intermediate result decision apparatus associated with FIGS. 19-21. This system is different from the embodiment associated with FIGS. 17 and 18 in that the input is not a real value but a fuzzy number. That is, the configuration includes a data input section 1901 for receiving as inputs thereto fuzzy data supplied from a control panel or the like, a work area section 1902 to store therein initial value data and/or intermediate inference results, and a fuzzy inference rule store section 1903 to store therein many inference rules for fuzzy inferences. Each inference rule is here represented in the format of "IF—(antecedent)—THEN—(consequent)" in which the antecedent is an inference statement including fuzzy variables and the consequent includes an ordinary function containing real numbers. The configuration further comprises an inference mechanism section 1904 including a fuzzy number store section 1905 to store therein fuzzy variables used in the antecedent and consequent of the fuzzy inference operation to represent such relationships in magnitude between control quantities as "Negative Big", "Zero", and "Positive Small", an inference rule control section 1906 to obtain inference rules from the fuzzy inference rule store section 1903, a fuzzy inference computing section 1907 to achieve a fuzzy inference in association with inference rules for the initial data or intermediate inference data from the work area section 1902 and to obtain an inference result, and a fuzzy label computing section 1908 to convert a fuzzy number as the inference result into a fuzzy label. At an intermediate point of an inference, the resultant fuzzy label is stored as an intermediate variable in the work area section 1902. The inference mechanism section 1904 uses the stored variable to conduct the subsequent inference. When the inference is completed, the real value is supplied as an inference result to a result output section 1909.

Figure 21:
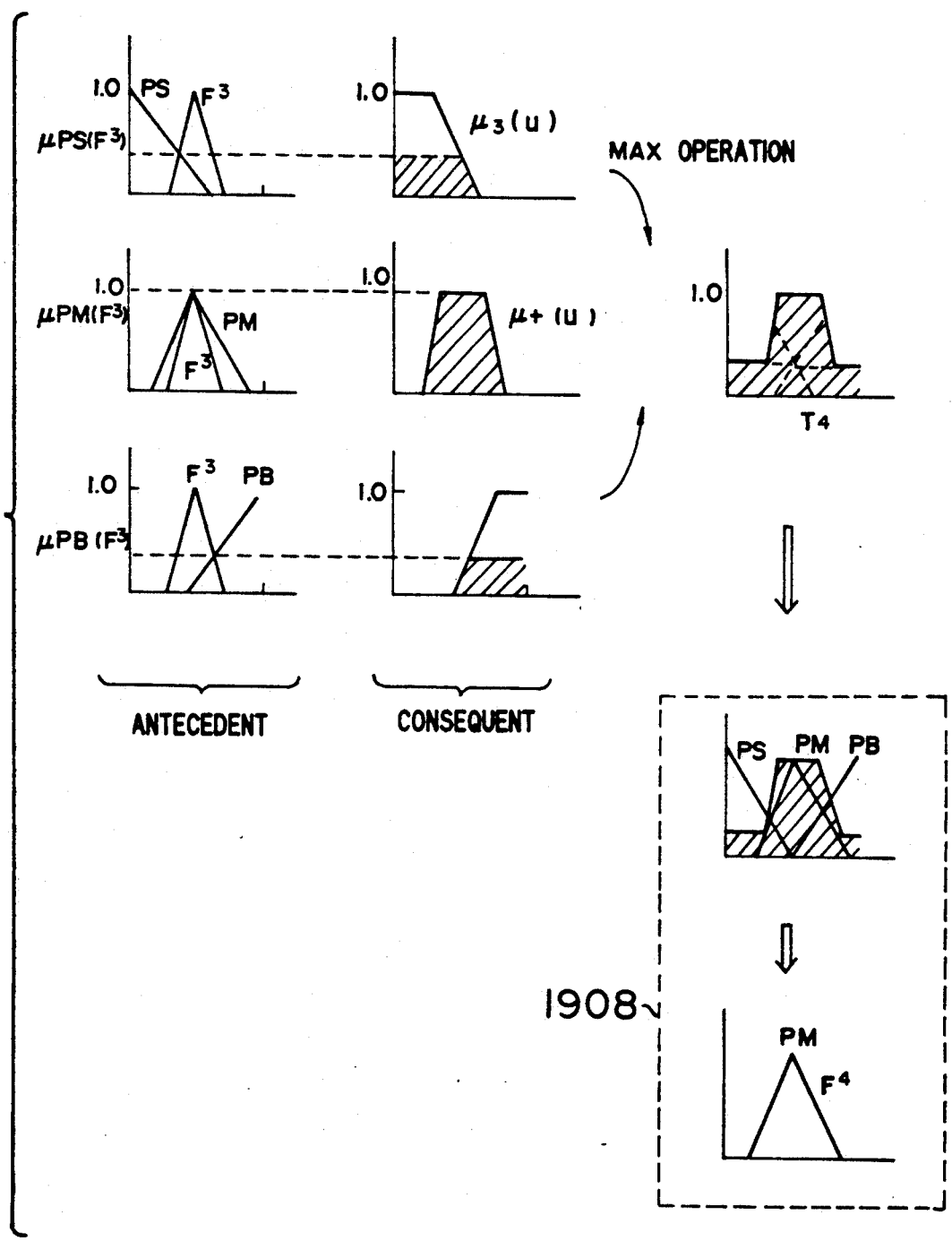
FIG. 21 is an explanatory diagram for explaining a fuzzy inference operation process in a second stage associated with the FIG. 19 embodiment.

Referring to FIGS. 20 and 21, a description will be given of the operation of the fuzzy multi-stage inference in the invention configured as described above.

In the first-stage inference, the system computes a strength of braking force (BR) to be required when a car is running at an intermediate running speed (CS) with an intermediate car interval (CL) at time t. Next, at time t+1, the system conducts an inference to determine ranges in the display for which the lamps are to be turned on. For the warning notification, the right-hand portion of the display is used, whereas for the safety notification, the left-hand portion thereof is employed, thereby a warning is reported to the passengers.

The fuzzy inference rule store section 1903 is loaded with a knowledge base 1 containing relationships between CL, CS, and BR in two rules as in the case of the first invention.

R1: IF CL is Small(PS) And CS is Big(PB) THEN BR is Big (PB)

R2: IF CL is Big(PB) And CS is Small(PS) THEN BR is Small (PS)

In the first-stage inference, the inference rule control section 1906 obtains the knowledge base 1 from the fuzzy inference rule store section 1903. For the initial value data (CL=Medium and CS=Medium), the fuzzy inference computing section 1907 conducts a min operation based on the following expressions. As a result, adaptation degrees of the antecedent and the consequent are computed for each rule.

In a case where fuzzy numbers (data) $F^0$ and $F^1$ respectively associated with "the car interval is medium" and "the running speed is medium" are supplied from a control panel or the like, the conclusion of the inference rule (first rule) above results in the following fuzzy number.

$$\mu_1(u) = \mu_{PS}(F^0) \wedge \mu_{PB}(F^1)$$

where $$\mu_{PS}(F^0) = \max(\mu_{PS}(f) \wedge \mu_{F^0}(f))$$

$$\mu_{PB}(F^1) = \max(\mu_{PB}(f) \wedge \mu_{F^1}(f))$$

In these expressions, $\wedge$ stands for min and fuzzy data items $F^0$ and $F^1$ designate fuzzy numbers similar to fuzzy variables. FIG. 20 illustratively shows a fuzzy variable $\mu_1(u)$. As shown in FIG. 20, the value of $\mu_1(u)$ is obtained as follows. A degree (membership value) $\mu_{PS}(F^0)$ of $F^0$ belonging to the fuzzy number PS of the antecedent is compared with a degree $\mu_{PS}(F^1)$ of $F^1$ belonging to the PB fuzzy number PB to determine the smallest value of the degree $\mu_{PS}(F^0)$. Subsequently, the obtained degree is used to limit (min) the fuzzy variable PB of the consequent to attain $\mu_1(u)$.

Since a plurality of control rules (1) are present, by combining the fuzzy numbers of all conclusions, the fuzzy number $T_3$ is obtained from the expression (2) as follows.

$$\mu T_3(u) = \mu_1(u) \wedge \mu_2(u) \wedge$$

The fuzzy number $T_3$, representing a fuzzy number of an inference result representing a control operation quantity, is then converted in the fuzzy label computing section 1908 into a fuzzy label $F^3$ for a similar reason as for the invention associated with FIGS. 17 and 18.

As a conversion method of the fuzzy label, the system determines the minimum value among the real differences between the inference result $T_3$ and the respective fuzzy labels Small (PS), Medium (PM), and Big (PB). In the example of FIG. 20, PM is selected as a fuzzy label $F^3$, which is supplied as the second-stage inference data to the work area section 1902.

In the second-stage inference, the inference rule control section 1906 obtains from the fuzzy inference rule store section 1903 a knowledge base 2 containing three rules as follows.

R1: IF BR is Small(PS) THEN AL is Small(PS)

R2: BR is Medium (PM) THEN AL is Medium(PM)

R1: IF BR is Big(PB) THEN AL is Big(PB)

Next, based on the intermediate result $F^3$ the fuzzy inference computing section 1907 achieves an inference in a similar fashion as for the first-stage inference to attain a fuzzy number of an inference result $T_4$ as shown in FIG. 21. The fuzzy label computing section 1908 converts the result into a fuzzy label $F_4$, which is used to turn lamps on in the right and left portion of the operator's panel for a warning to the passengers. The third-stage and subsequent inferences are similarly conducted to achieve the multi-stage inference.

Figure 19:
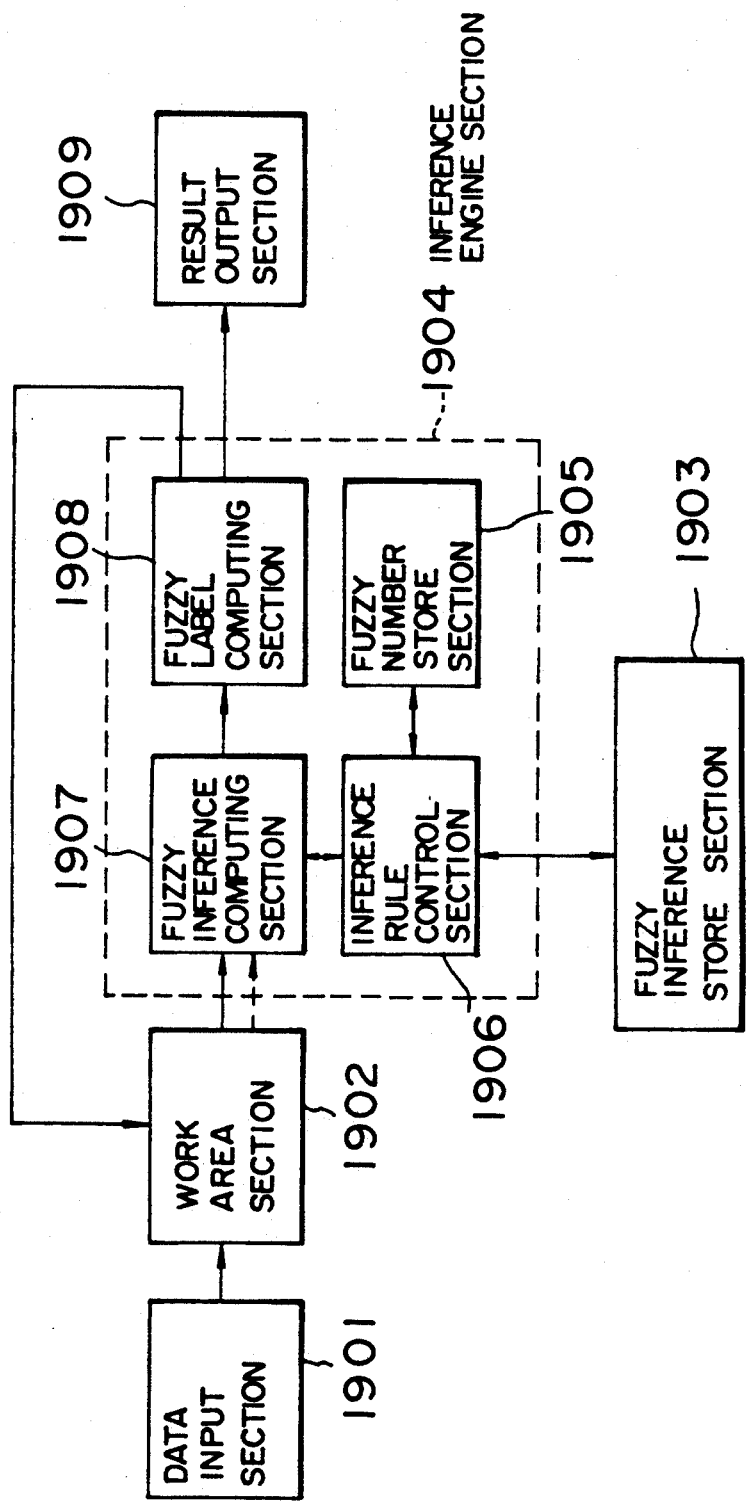
FIG. 19 is a configuration diagram of an embodiment including an intermediate result decision device.

In the example of the invention associated with FIGS. 19-21, the second-stage inference employs only an intermediate result. However, as indicated with a broken line in association with the work area section 1902 and the fuzzy inference computing section 1907 in FIG. 19 as an invention associated with FIG. 19, the input data at $t+1$ may be used together with the intermediate inference result for the inference. Since other configurations are the same as those of the invention associated with FIGS. 19-21, a redundant detailed description thereof will be omitted. In this configuration, a result of an inference achieved by use of preceding data and the current input data can be employed for a multistage inference. In consequence, this configuration is quite suitable when a learning process and a forecasting operation are involved.

Figure 22:
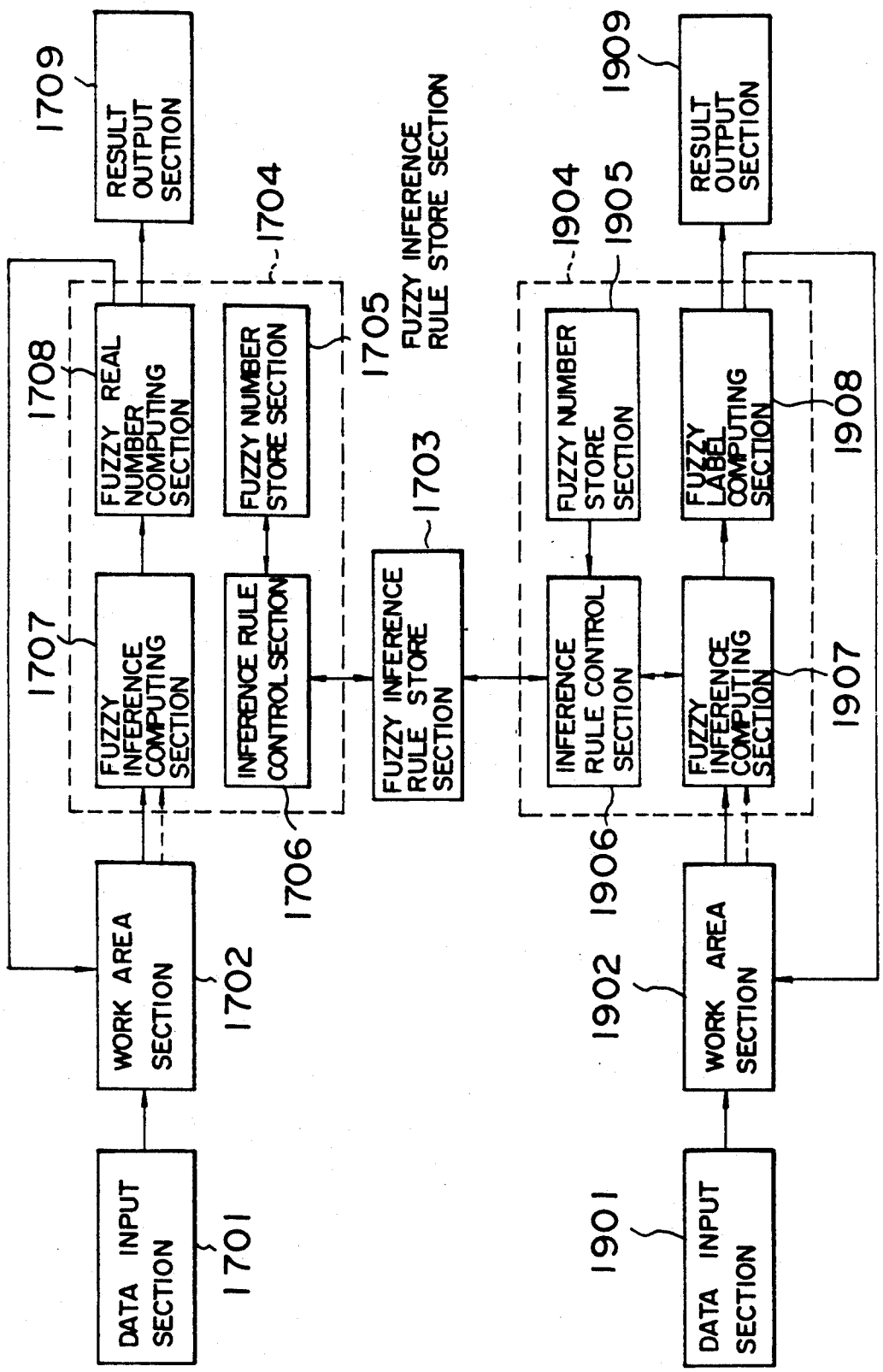
FIG. 22 is a configuration diagram of an embodiment including an intermediate result decision device.

Furthermore, with respect to an invention associated with FIG. 22, when the system is configured such that the fuzzy inference rule store sections 1703 and 1903 storing therein knowledge bases are combined in a common section and that the fuzzy inference mechanisms 1704 and 1904 are respectively disposed, the multi-stage inference is also possible in any cases where input values contain real values and fuzzy numbers. Moreover, since the identical knowledge base can be used, the operation to create inference rules and the memory to store the generated rules can be reduced.

Next, a description will be given of another embodiment in accordance with the present invention. Configurations or modes of embodying this embodiment will be described with reference to FIGS. 23-27.

As an embodiment of FIGS. 23-27, a system in which production lines are changed over therebetween in a firm will be described.

In the firm, two kinds of materials 1 and 2 are used to produce one kind of product. The firm comprises three types of production lines X, Y, and Z, which are selected for production depending on quantities of the materials 1 and 2. Consequently, during a period from the start of production to the end thereof at which the target total production is attained, the production lines are required to be changed over therebetween. For a highly efficient production, before the production is initiated, it is necessary to set a target total production and target average cost to appropriately change over between the production lines depending on the varying quantities of the materials 1 and 2. In this system, when the target total production and the target average or mean cost are initially established, an inference is achieved based on three variables including the kind of the current line and the quantities of the materials 1 and 2 to determine a production line to be next operated. This operation is repeatedly conducted to produce a schedule of change-over operations between production lines, thereby achieving the two targets above.

Figure 23:
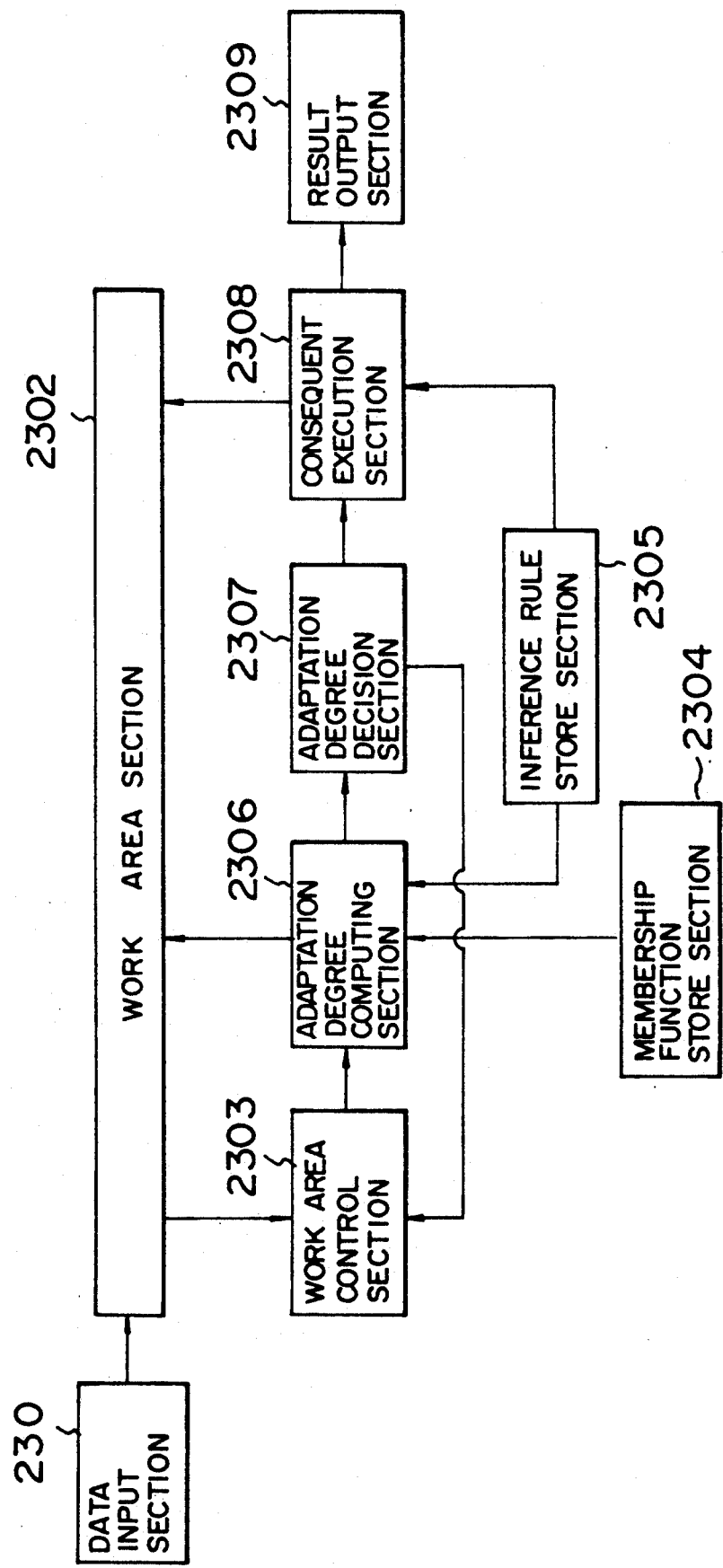
FIG. 23 is a configuration diagram of an embodiment including an inference re-execution start device.

FIG. 23 shows the configuration of an embodiment in accordance with the present invention. In this configuration, based on a fuzzy implication inference rule, an inference rule associated with an antecedent having the greatest adaption degree is executed to achieve a fuzzy inference. The system of FIG. 23 includes a data input section 2301 to receive data from an external device, a work area section 2302 to store therein input data, adaptation degrees attained by an adaptation degree computing section 2306 and intermediate inference results obtained by a consequent executing section 2308; a work area section control section 2303 to obtain input data from the work area section 2302 according to a decision made by an adaptation degree decision section 2307, a membership function store section 2304 to store therein a plurality of membership functions, an inference rule store section 2305 to store therein a plurality of fuzzy implication inference rules, the adaptation degree computing section 2306 to obtain, for input data, an adaptation degree of an antecedent of an inference rule stored in the inference rule store section 2305 by use of membership functions loaded in the membership function store section 2304, the adaptation degree decision section 2307 to determine, based on the adaptation degree attained by the adaptation degree computing section 2306, whether or not a backtrack operation is to be conducted, the consequent executing section 2308 to obtain, based on the adaptation degree attained by the adaptation degree computing section 2306, an intermediate inference result from the inference rules stored in the inference rule store section 2305, and a result output section to output an inference result when the inference is completed.

Figure 25:
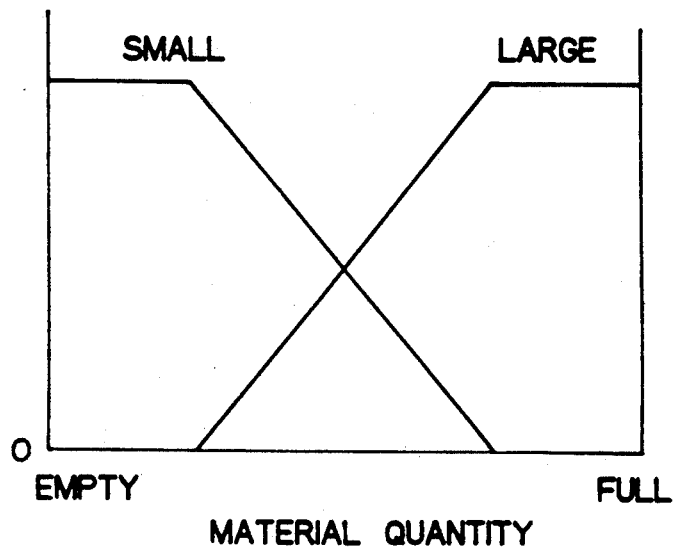
FIG. 25 is a graph showing membership functions of material quantity.

FIG. 24 shows a description example of the inference rule store section 2305 in which the antecedent and consequent are those of a fuzzy implication inference rule in the form "if—then —". Moreover, attributes "Large" and "Small" associated with the quantities of the materials 1 and 2 are labels indicating fuzzy numbers, respectively. "End" described in the consequent designates that the inference is completed when the pertinent inference rule is executed. FIG. 25 shows membership functions of the fuzzy numbers "large" and "small".

Next, a description will be given of a method to determine candidates of the subsequent line based on the preceding line and the quantities of the materials 1 and 2. The adaptation degree computing section 2304 is capable of computing an adaptation degree $m_i$ of an antecedent of an i-th inference rule Ri ($1 \leq i \leq 13$) based on the following expression.

$$m_i = m^i_{LINE} \text{ (Current line)}$$
$$\wedge m^i_{M1} \text{ (Quantity of material 1)}$$
$$\wedge m^i_{M2} \text{ (Quantity of material 2)},$$

where, $\wedge$ denotes a min operation.

$m_{LINE}{}^i = 1$: The current line matches the inference rule condition.

$m_{LINE}{}^i = 0$: The current line does not match the inference rule condition.

In these expressions, $m_{M1}{}^i$ and $m_{M2}{}^i$ respectively indicate adaptation degrees (membership values) of input values of the materials 1 and 2 with respect to fuzzy numbers denoting the quantities of the materials 1 and 2 described in the antecedent of the inference rule Ri. A consequent of an inference rule of which the antecedent has the highest adaptation degree is determined as a candidate for the next line.

A description will be given of the operation of the inference re-execution starting device thus configured in association with FIGS. 23–27. On receiving initial input data, the data input section 2301 delivers the input data to the work area section 2302. The work area section control section 2303 obtains appropriate initial input data or an appropriate intermediate inference result from the work area section 2302. The adaptation degree computing section 2306 then obtains an adaptation degree of an antecedent of each inference rule. The obtained adaptation degrees are stored in the work area section 2302 for use when a backtrack operation is required. The adaptation degree decision section 2307 conducts a backtrack operation in a case where the highest adaptation degree selected from the adaptation degrees thus stored satisfies the following condition.

$m_{MAX}(n) < m(n-1)$, where n is a cycle number.

In this expression, $m_{MAX}(n)$ and $m(n-1)$ respectively stand for the highest adaptation degree obtained from the inference in the current stage and the adaptation degree of the inference rule executed during the inference in the preceding cycle.

When the backtrack operation is not required, the consequent executing section 2308 obtains an intermediate inference result from the consequent of the inference rule having the highest adaptation degree and then stores the result of the inference in the work are section 2302.

When the backtrack operation is required, the adaptation degree decision section 2307 sends to the work are section control section 2303 a signal denoting a backtrack occurrence. The work area section control section 2303 then obtains from the work area section 2302 an adaptation degree of the inference in the preceding cycle. The consequent executing section 2308 selects from the inference rules not executed, for example, an inference rule having the highest adaptation degree. Based on the consequent of the inference rule, the consequent executing section 2308 obtains a intermediate result for the subsequent inference to store the result in the work area section 2302.

By repeatedly achieving the sequence of operations above, the inference is re-executed. In a case where an inference rule containing a consequent including an end instruction is executed or in a case where an inference rule is missing in the backtrack operation, the inference is completed and the inference result is sent to the result output section 2309.

Figure 26:
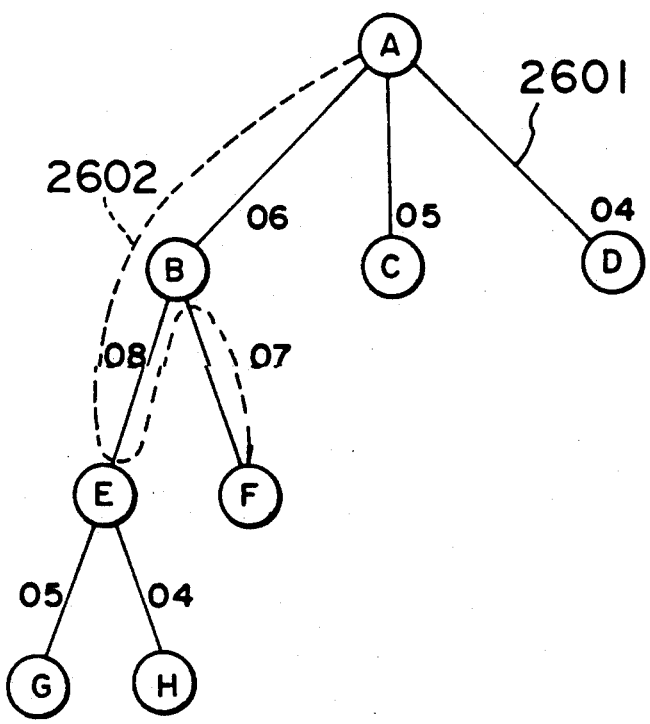
FIG. 26 is a schematic diagram showing an example of the operation achieved in the embodiment of FIG. 23.

FIG. 26 schematically shows an example of the multistage inference in this embodiment. FIG. 26 includes an initial input A, intermediate inference results B to H, a solid line 2601 denoting an inference rule of which the antecedent matches with the input data A, a numeral 0.4 denoting an adaptation degree of the inference rule, and a dotted line 2602 indicating an inference route actually employed for the inference. When the inference is started, based on the initial input A, the intermediate inference results B, C, and D are obtained. Based on an inference rule having the highest adaptation degree (=0.6), the intermediate result B is selected. Through the next inference, the intermediate results E and F are obtained. However, since the inference rules to attain the intermediate results E and F have adaptation degrees 0.8 and 0.7 not less than 0.6, the inference is continued to select the intermediate result E. However, as shown in FIG. 26, in an inference using the intermediate result E, since the adaptation degrees are 0.5 and 0.4 not exceeding 0.8, the backtrack operation is started to return to B. Next, the intermediate result F obtained by use of an inference rule of which the antecedent has the second highest adaptation degree is executed. Since the intermediate result F includes a consequent containing an end instruction, the inference is terminated and the intermediate inference result F is supplied as a final inference result.

In this connection, the above embodiment employs the condition $m_{MAX}(n) < m(n-1)$ for the initiation of the backtrack operation. However, there may be used a general description $m_{MAX}(n) < f(m(n-1))$ or $m_{MAX}(n) < k$ may be used. In the expressions above, f indicates a functional operation and k is a constant satisfying $0 < k \leq 1$.

Figure 27:
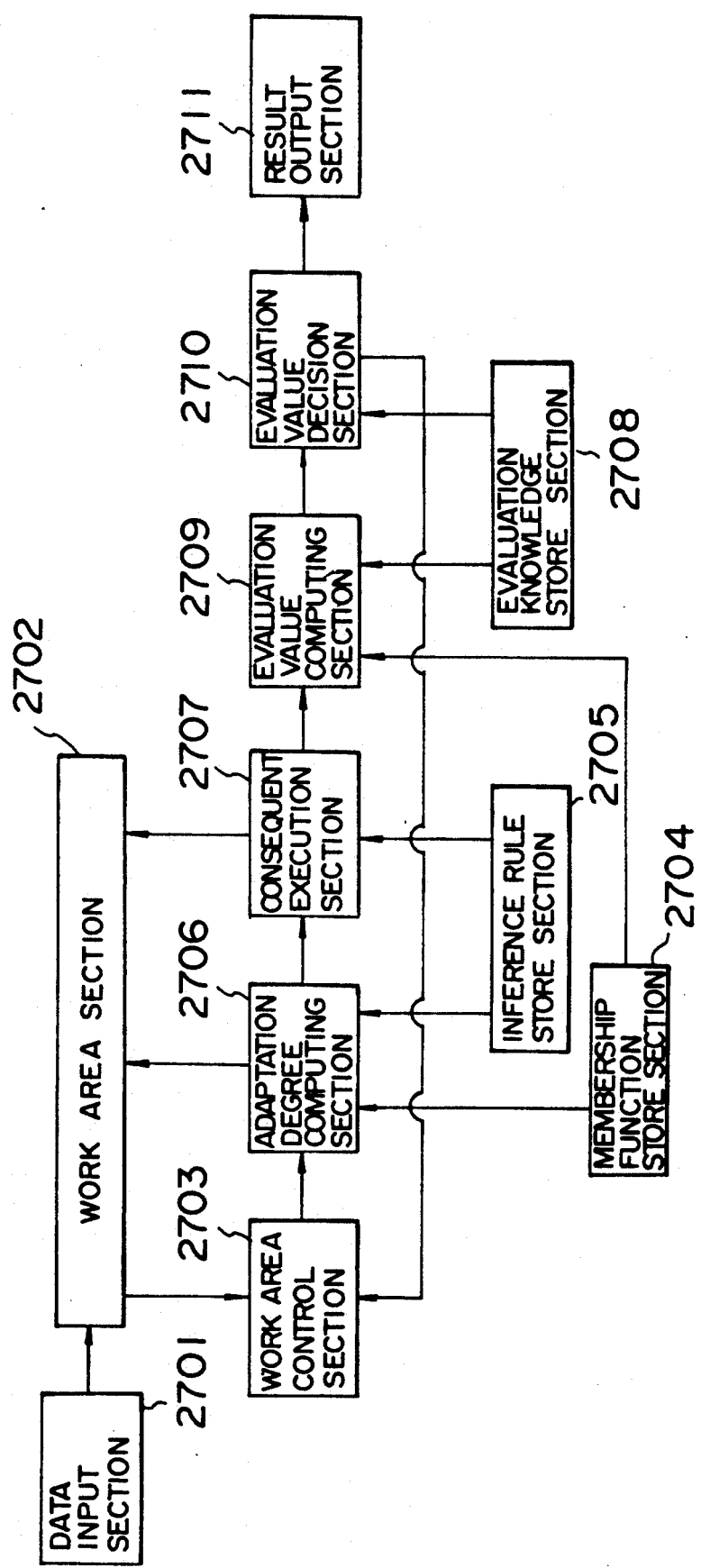
FIG. 27 is a configuration diagram of an embodiment including an inference re-execution start device.

Referring next to FIG. 27, a description will be given of an embodiment of the inference re-execution starting apparatus in accordance with the present invention. In this configuration, fuzzy implication inference rules are adopted to execute an inference rule of which an antecedent has the highest adaptation degree. The system of FIG. 27 includes a data input section 2701 to receive input data from an external device, a work area section 2702 to store therein adaptation degrees obtained by an adaptation degree computing section 2706 and intermediate inference results attained by a consequent executing section 2707, a work area control section 2703 to obtain input data from the work area section 2708 based on a decision from an evaluation value decision section 2709, a membership function store section 2704 to store therein a plurality of membership functions, an inference rule store section 2705 to store therein a plurality of implication inference rules, an adaptation degree computing section 2706 to obtain an adaptation degree of an antecedent of an inference rule stored in the inference rule store section 2705 by use of membership functions loaded in the membership function store section 2704, a consequent executing section 2707 to obtain, based on the adaptation degree attained by the adaptation degree computing section 2706, an intermediate inference result from an inference rule stored in the inference rule store section 2705, an evaluation knowledge store section 2708 to store therein evaluation knowledge to be used to obtain an evaluation value of the intermediate inference result from the consequent execution section 2707, the evaluation value computing section 2709 to obtain an evaluation value of the intermediate inference result by use of the evaluation knowledge stored in the evaluation knowledge store section 2708 and the membership functions loaded in the membership function store section 2704, an evaluation value decision section 2710 to determine whether or not the backtrack is to be conducted based on the evaluation value from the evaluation value computing section 2709, and a result output section 2711 to output an inference result when the inference is terminated.

FIG. 28 shows a description example of the inference rule store section 2705. Although the number of inference rules of FIG. 28 is different from that of FIG. 24, details thereof are identical and hence a redundant description will be omitted.

Figure 30:
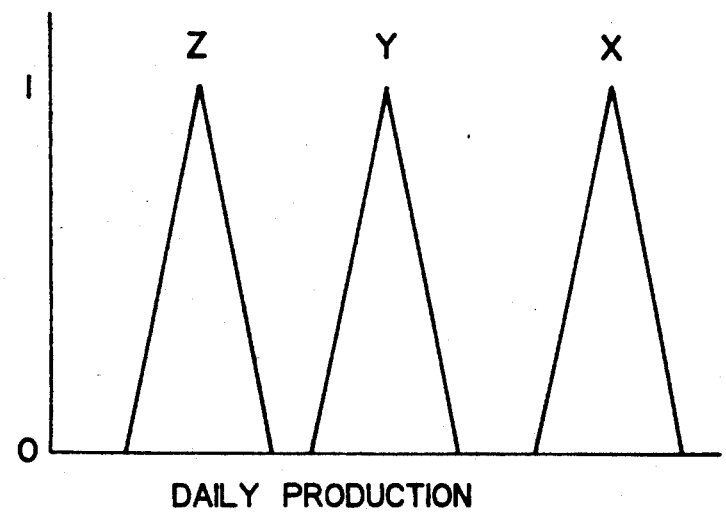
FIG. 30 is a graph showing membership functions representing daily product for each line.
Figure 31:
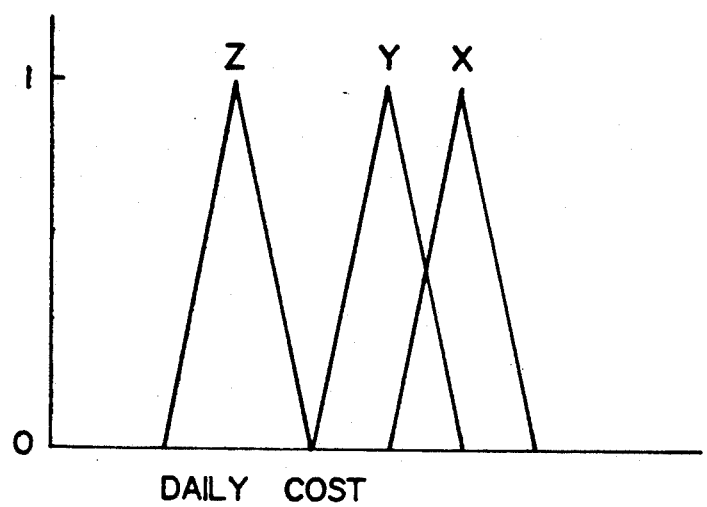
FIG. 31 is a graph showing membership functions representing daily cost for each line.
Figure 32:
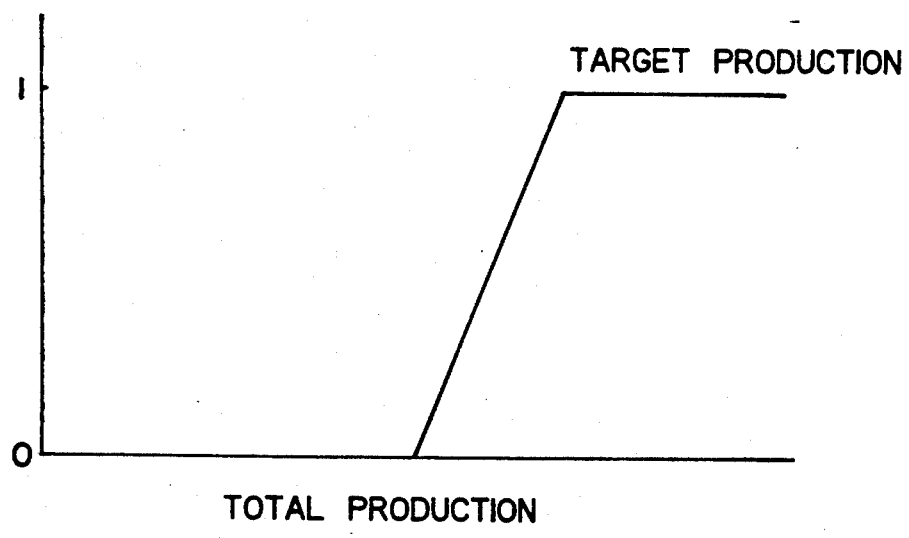
FIG. 32 is a graph showing a membership function representing a target production.
Figure 33:
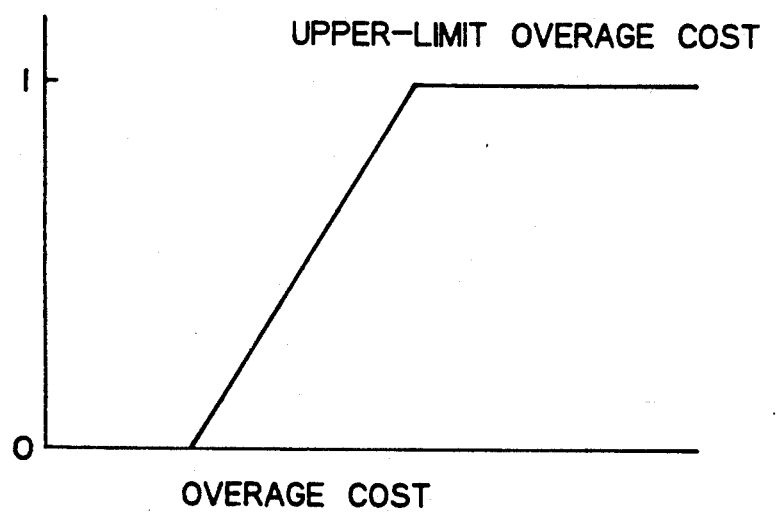
FIG. 33 is a graph showing a membership function representing a target product.

FIG. 29 shows an example of the evaluation knowledge store section 2708. In this embodiment, the contents of this section 2708 includes a functional operation section and an evaluation computing section. In this presentation, "Daily production", "Daily cost", "Target production", and "Upper-limit average cost" designate fuzzy numbers; whereas "Total production", "Total cost", and "Average cost" denote variables. FIGS. 30, 31, 32, and 33 respectively show membership functions of "Daily production", "Daily cost", "Target production" and "Upper-limit average cost". In FIGS. 30 and 31, letters X, Y, and Z indicate kinds of the respective lines.

The operation of this embodiment will now be described. Based on the intermediate result (the kind of line) of the inference, local fuzzy numbers such as the total product, the total cost, and the average cost are obtained. Under conditions that the total production is equal to the target production and the average cost is identical to the upper-limit average cost, an adaptation degree is determined as an evaluation value. Assuming the membership functions of the total product, the target product, the average cost, and the upper-limit average cost to be $\mu_{SP}(x)$, $\mu_{OP}(x)$, $\mu_{AC}(y)$, and $\mu_{GAC}(y)$ (X∈ Set of production items, y∈ Set of cost items), the computation of an adaptation degree $m_c$ is carried out as follows, for example:

$$m_c = \sup_x(\mu_{SP}(x) \wedge \mu_{OP}(x))$$

$$\wedge \sup_y(\mu_{AC}(y) \wedge \mu_{GAC}(y))$$

In this expression, ∧ stands for a min operation.

Next, a description will be given of the operation of the inference re-execution starting apparatus according to the present invention. On receiving initial input data, the data input section 2701 sends the input data to the work area section 2702. The work area section control section 2703 obtains appropriate initial input data or an appropriate intermediate inference result from the work area section 2702. The adaptation degree computing section 2306 then obtains an adaptation degree of an antecedent of each inference rule. The obtained adaptation degrees are stored in the work area section 2702 for use when a backtrack operation is required. The consequent executing section 2707 selects an inference rule having the highest adaptation degree to attain an intermediate inference result from a consequent of the inference rule. The result is then stored in the work area section 2702. The evaluation value computing section 2709 computes an evaluation value of the intermediate inference result. The evaluation value decision section 2710 conducts the following computation for the evaluation value. A backtrack operation is carried out when the following condition is satisfied:

$$c(n) < c(n-1)$$

In this expression, $c(n)$ and $c(n-1)$ respectively stand for the evaluation value of the intermediate inference result from the inference in the current stage and the evaluation value of the intermediate inference result from the inference in the preceding cycle.

When the backtrack operation is not required, the evaluation value decision section 2710 sends to the work area section control section 2703 a signal denoting the state that a backtrack has not occurred. The inference is then continued.

When the backtrack operation is required, the evaluation value decision section 2710 sends to the work area section control section 2703 a signal denoting a backtrack occurrence. The work area section control section 2703 then obtains from the work area section 2702 an adaptation degree of the inference in the preceding cycle. The consequent executing section 2707 selects from the inference rules not executed, for example, an inference rule having the highest adaptation degree.

Based on the consequent of the inference rule, the consequent executing section 2308 obtains an intermediate result for the subsequent inference to store the result in the work area section 2702.

By repeatedly executing the sequence of operations above, the inference is re-executed. In a case where an inference rule containing a consequent including an end instruction is executed or in a case where an inference rule is missing in the backtrack operation, the inference is terminated and the inference result is sent to the result output section 2711.

Figure 34:
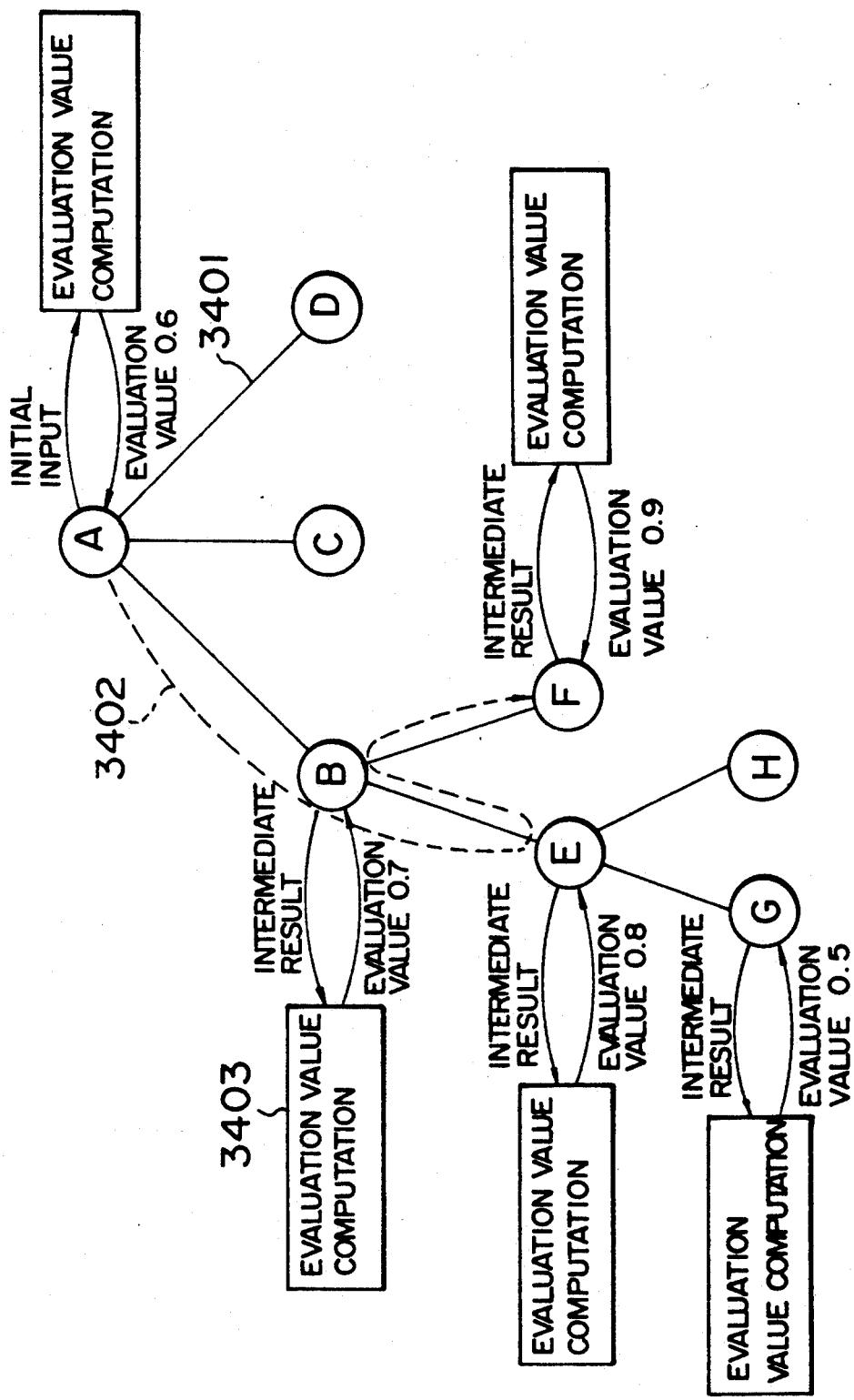
FIG. 34 is a diagram schematically showing an operation example of the embodiment of FIG. 27.

FIG. 34 shows an example of the multi-stage inference in this embodiment. The system of FIG. 34 includes an initial input A, intermediate inference results B to F, a solid line 3401 denoting an inference rule of which the antecedent matches with the input data A, a dotted line 3402 indicating an inference route actually employed for the inference, and a block 3403 designating a computation to be achieved by the evaluation value computing section 2709 to attain an evaluation value. Let us assume here the evaluation value of A to be 0.6. Based on the initial input A, the intermediate inference results B, C, and D are obtained. By use of an inference rule having the highest adaptation degree, the evaluation value 0.7 of the intermediate result B is obtained. Since the evaluation value 0.7 is greater than 0.6, the backtrack operation is not required. Through an inference based on B, the intermediate results E and F are obtained. Based on the inference rule having the highest adaptation degree, the evaluation value of E is attained as 0.8, which is greater than 0.7. In consequence, the backtrack operation does not take place. However, the evaluation value 0.5 is attained for the intermediate result of an inference rule having the highest adaptation degree in the subsequent inference. The backtrack operation is hence required and control returns to B. From this point, the intermediate result F obtained by use of another inference rule is executed. Since the intermediate result F includes a consequent containing an end instruction, the inference is terminated and the intermediate inference result F is supplied as a final inference result.

In this connection, the embodiment above uses the condition $c(n) < c(n-1)$ for the initiation of the backtrack operation. However, there may be used a general description $m(n) < f(m(n-1))$ or $c(n) < k$ may be used. In the above expressions, f indicates a functional operation and k is a constant satisfying $0 < k \leq 1$. In addition, although this embodiment uses fuzzy implication inference rules for the inference, implication inference rules according to the binary logic may also be adopted for the inference. Furthermore, the evaluation knowledge store section 2708 includes the functional operation section and the evaluation value computing section; however, the functional operation section may be omitted. Moreover, although the evaluation value computing section utilizes as the evaluation value an adaptation degree of the fuzzy condition, a fuzzy functional operation may also be employed and/or a fuzzy inference may be used to attain an evaluation value.

Next, a description will be given of another embodiment in accordance with the present invention. Modes or configurations of embodying the invention of such embodiment will be described with reference to embodiments associated with FIGS. 35-42.

Figure 35:
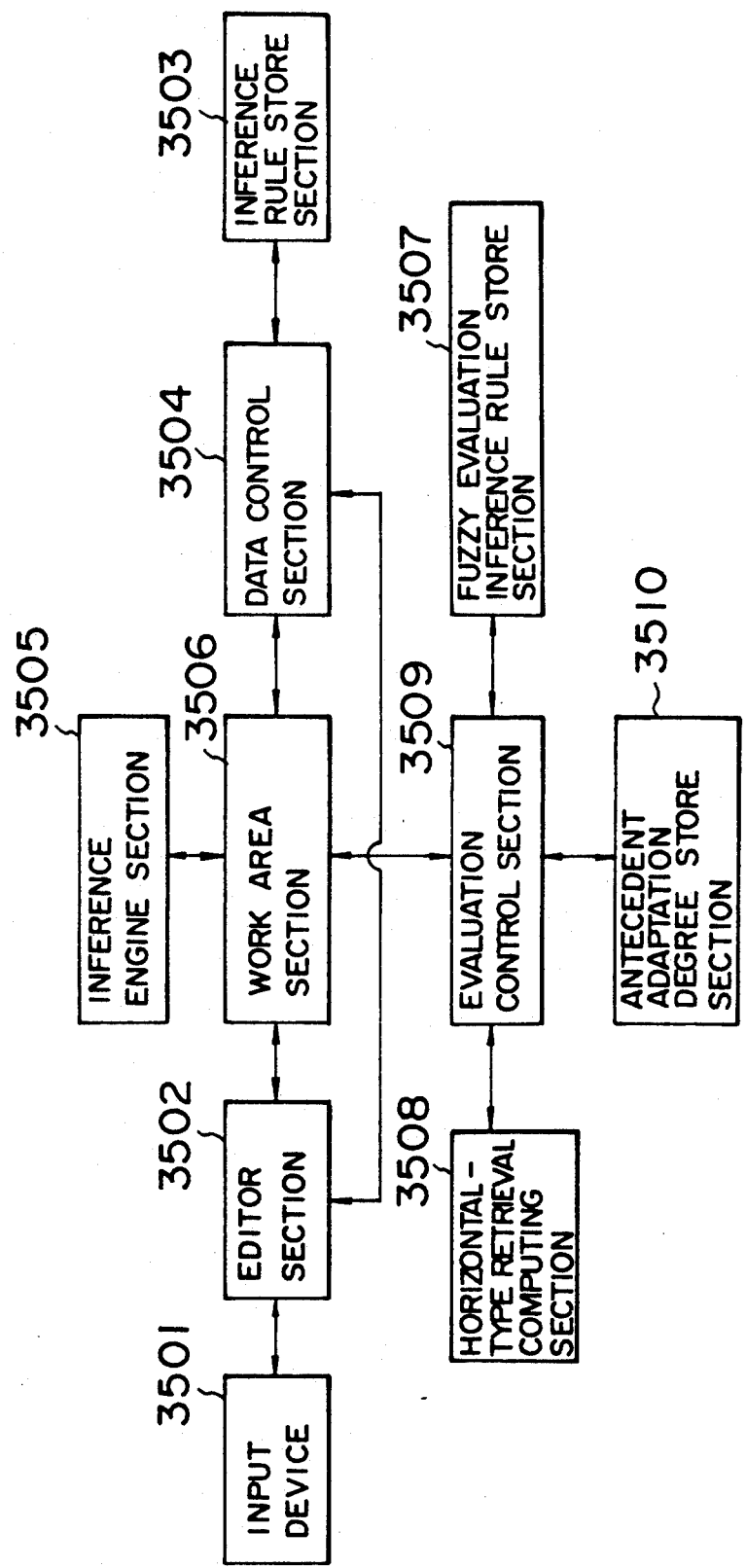
FIG. 35 is a diagram showing an embodiment including an inference re-execution rule retrieval device.

FIG. 35 is a configuration diagram of an embodiment of the inference re-execution rule retrieval apparatus in accordance with the present invention. This system includes an input device to input knowledge in an inference rule store section 3503 storing production rules and/or to issue a response to a question from the system side in an inference process, an editor section 3502 to edit data in the inference rule store section 3503, and the inference rule store section 3503 to store therein production rules for which a fuzzy inference and a binary logic inference are possible. A production rule associated with the fuzzy inference comprises a conditional field thereof represented with fuzzy numbers or in an ordinary binary logic representation and a conclusion field expressed with fuzzy numbers. A production rule related to the binary logic inference includes a rule conditional field represented with fuzzy numbers or in an ordinary binary logic representation and a conclusion field expressed with an action (execution statement) in a binary logic representation. The system further includes a data control section 3504 to get production rules from the inference rule store section 3503, an inference mechanism section 3505 to interpret a fact depending on an input supplied from the user by means of the input device 3501 and to prepare various functions to carry out fuzzy and binary logic inferences based on an adaptation with respect to production rules from the data control section 3504, a work area section 3506 to obtain various functions from the inference mechanism section 3505 to match the user's input data with production rules attained from the data control section 3504 so as to achieve fuzzy and binary logic inferences, a fuzzy evaluation inference rule store section 3507 to store therein production rules represented in the IF ... THEN—format to evaluate a result of the inference execution, an antecedent adaptation degree store section 3510 to store therein adaptation degrees of antecedents of the respective rule adaptive to the data in the work area section 3506, a horizontal-type retrieval computing section 3508 to obtain adaptation degrees of antecedents of a predetermined number of rules from the antecedent adaptation store section 3510 to retrieve inference rules in a descending order of adaptation degrees, and an evaluation control section 3509 to retrieve rules by use of the horizontal-type retrieval computing section 3508 until the evaluation value of the fuzzy evaluation inference rule store section 3507 is satisfied, thereby repeatedly achieving the multi-stage inference.

Figure 36:
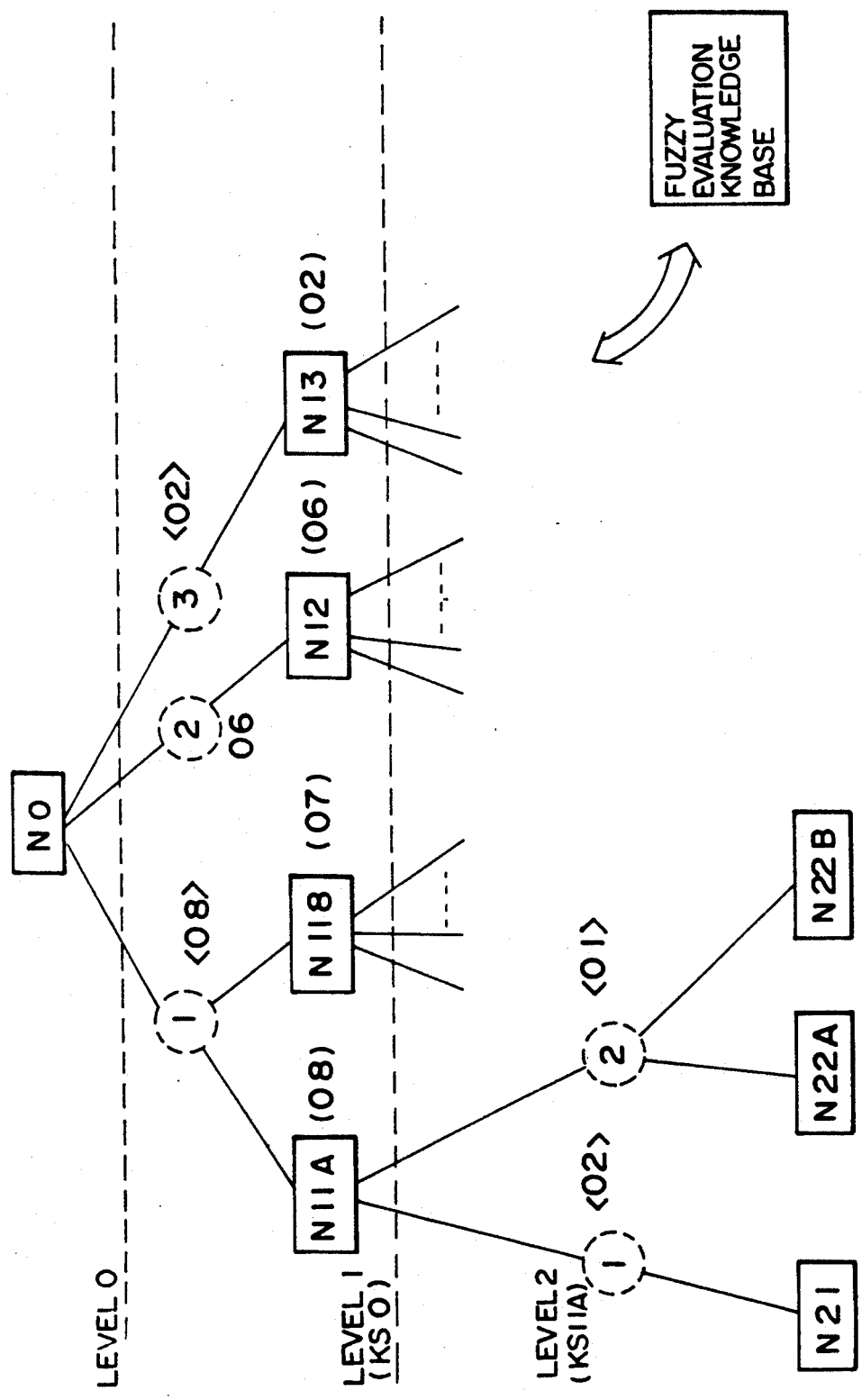
FIG. 36 is a schematic diagram showing a node retrieval associated with the FIG. 35 embodiment.

Referring next to FIG. 36, a description will be given of the horizontal-type retrieval method used in the inference re-execution rule retrieval apparatus thus constituted in association with FIG. 35.

FIG. 36 shows a node retrieval diagram associated with the inference re-execution rule retrieval apparatus. In this diagram, the numbers in the circles drawn with broken lines and in brackets < > respectively denote the respective rule numbers and adaptation degrees of antecedents thereof with respect to the input data. Parenthesized values designate evaluation values of the rules attained by the fuzzy evaluation inference rule store section 3507. In this example, the multi-stage fuzzy inference is accomplished through a route of nodes N0, N11A and N21.

In accordance with the invention of FIGS. 35 and 36, the horizontal-type retrieval computing section 3508 gets adaptation degrees of antecedents of a predetermined number of rules from the antecedent adaptation degree store section 3510 to retrieve inference rules in a descending order of adaptation degrees. That is, in the diagram of FIG. 36, since the level-1 portion includes antecedents having adaptation degrees 0.8, 0.6, and 0.2 and the level-2 portion comprises antedecents with adaptation degrees 0.2 and 0.1, the inference is carried out in the node number order of NO, N11A, N11B, N12, N13, N21, N22A, and N22B. In this manner, the inference is repeatedly conducted until the evaluation value of the fuzzy evaluation inference rule store section 3507 is satisfied. Although this retrieval method is similar to the horizontal-type retrieval method employed in the ordinary expert system, the difference resides in that fuzzy numbers are used in the retrieval.

Figure 37:
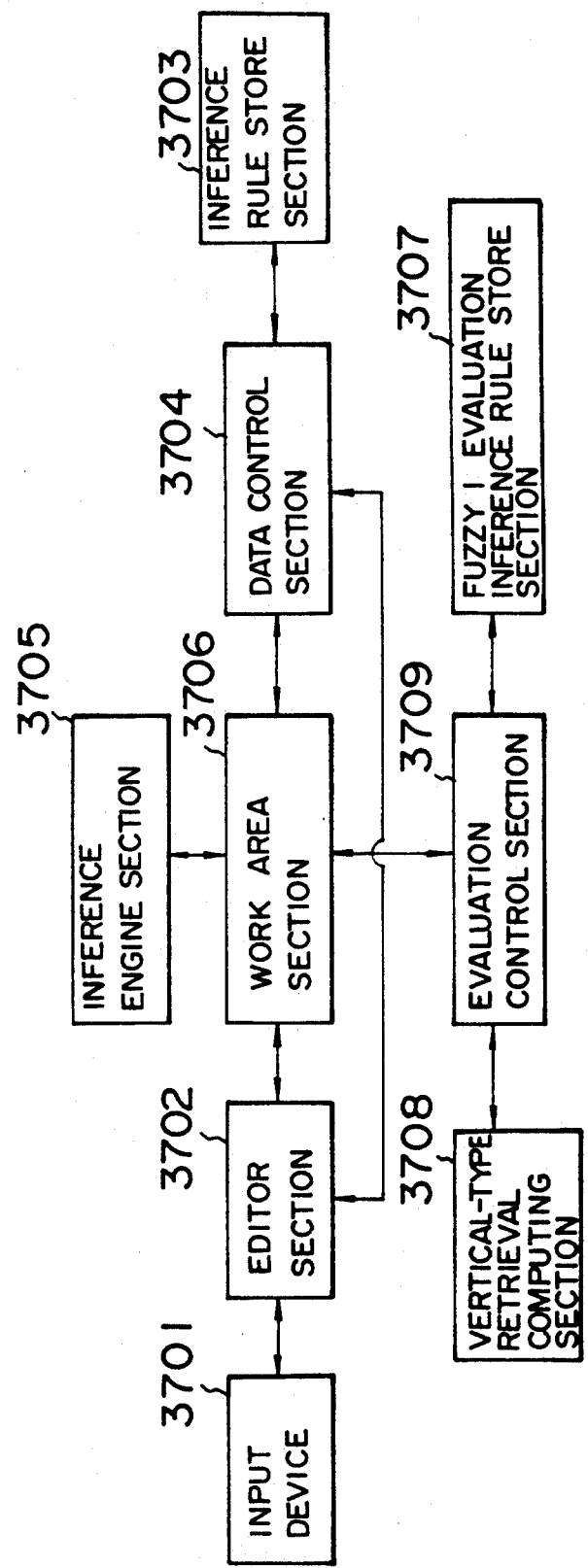
FIG. 37 is a configuration diagram showing an embodiment associated with the FIG. 35 embodiment including an inference re-execution rule retrieval device.

Referring now to FIG. 37, a description will be given of an embodiment of an inference re-execution rule retrieval apparatus. In this system, constituent components 3701 to 3707 are identical to those used in the configuration of FIG. 35. Consequently, a redundant description thereof will be here omitted. Reference numeral 3708 denotes a vertical-type retrieval computing section in which for a particular rule, the multi-stage inference is conducted with respect to the rule as many times as possible. When the multi-stage inference becomes impossible, another rule having the adaptation degree next to that of the rule just processed is selected from the rules of knowledge source to which the rule belongs. Or, the system selects from a father knowledge source of the knowledge source a rule having the adaptation degree next to that of the rule just processed. Numeral 3709 is an evaluation control section in which the vertical-type retrieval computing section 3708 searches for rules until the evaluation value of the fuzzy evaluation inference rule store section 3707 is satisfied, thereby repeatedly achieving the multi-stage inference.

Referring next to FIGS. 37 and 36, a description will be given in more detail of the vertical-type retrieval method used in the inference rule re-execution rule retrieval apparatus thus constructed.

In accordance with the invention of FIGS. 36 and 37, for a particular rule, the vertical-type retrieval computing section 3708 conducts the multi-stage inference as many times as possible. When the inference becomes impossible, another rule having the adaptation degree next to that of the rule just processed is selected from the rules of knowledge source to which the rule belongs. Or, the system selects from a father knowledge source of the knowledge source a rule having the adaptation degree next to that of the rule just processed. That is, in FIG. 36, since the level-1 portion includes antecedents having adaptation degrees 0.8, 0.6, and 0.2 and the level-2 portion comprises antedecents with adaptation degrees 0.2 and 0.1, the inference is carried out in the node number order of NO, N11A, N21, N22A, N11, etc. In this manner, the inference is repeatedly conducted until the evaluation value of the fuzzy evaluation inference rule store section 3507 is satisfied. Although this retrieval method is similar to the vertical-type retrieval method employed in the ordinary expert system, the difference resides in that fuzzy numbers are used in the retrieval.

Figure 38:
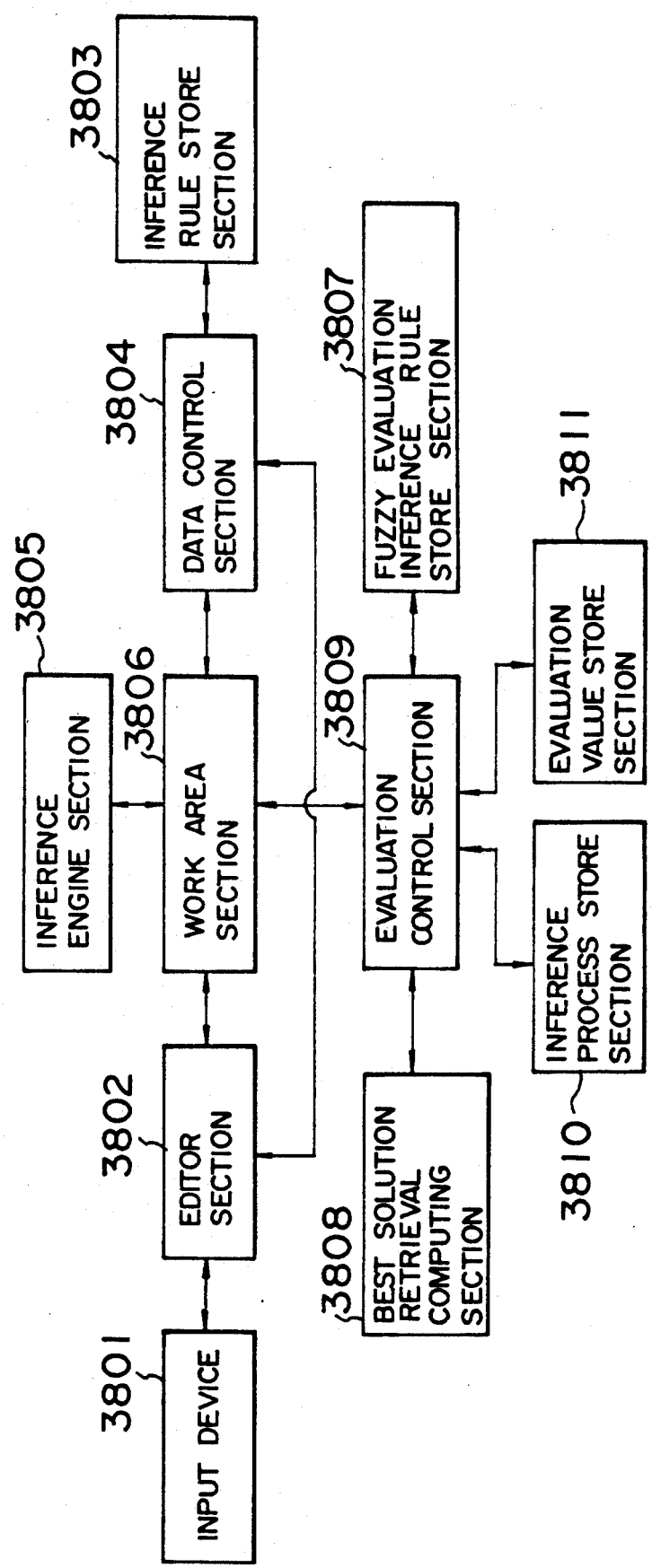
FIG. 38 is a configuration diagram showing an embodiment associated with the FIG. 35 embodiment including a inference re-execution rule retrieval device.

Referring next to FIG. 38, a description will be given of an embodiment of the inference re-execution rule retrieval apparatus. In this system, constituent components 3801 to 3807 are identical to those used in the configuration of FIG. 35. Consequently, a redundant description thereof will be here omitted. Reference numeral 3810 denotes an evaluation value store section to store therein the evaluation values of rules for which inferences are already achieved in association with the fuzzy evaluation inference rule store section 3807. Numeral 3810 is an inference process store section to store therein processes of inferences. Reference numeral 3808 denotes a best solution retrieval computing section to first obtain from the inference process store section 3810 a father rule from which the current inference in process is attained. The father rule is used as a retrieval or search destination to be sequentially produced after the backtrack operation is started. In the consequent of the rule, this section 3808 determines a search or retrieval instruction associated with a knowledge source of which the evaluation value in the evaluation value store section 3811 is next to the current evaluation value. Numeral 3809 designates an evaluation control section in which the best solution retrieval computing section searches for rules until the evaluation value of the fuzzy evaluation inference rule store section 3808 is satisfied, thereby repeatedly achieving the multi-stage inference.

Referring next to FIGS. 38, 39, and 36, a description will be given in more detail of the best solution search or retrieval method used in the inference rule re-execution rule retrieval apparatus thus constructed.

In accordance with the invention associated with FIGS. 36 and 38, the best solution retrieval computing section obtains from the inference process store section 3810 a father rule from which the current inference in process is attained. The father rule is used as a retrieval or search destination to be sequentially produced after the backtrack operation is started such that in the consequent of the rule, this section 3808 determines a search or retrieval instruction associated with a knowledge source of which the evaluation value in the evaluation value store section 3811 is next to the current evaluation value. For example, assuming that the node N21 is currently being executed, the present rule is the first rule of a knowledge source KS11A of FIG. 39. The father rule from which this rule is attained is the first rule of a knowledge source KS0. In FIG. 36, a node having an evaluation value next to the evaluation value 0.8 of the node N11A is the node N11B with the evaluation value 0.7. In consequence, the multi-stage inference is carried out in the node number order of NO, N11A, N21, N11B, etc. In this fashion, the inference is repeatedly achieved until the evaluation value of the fuzzy evaluation inference rule store section 3807 is satisfied.

Figure 40:
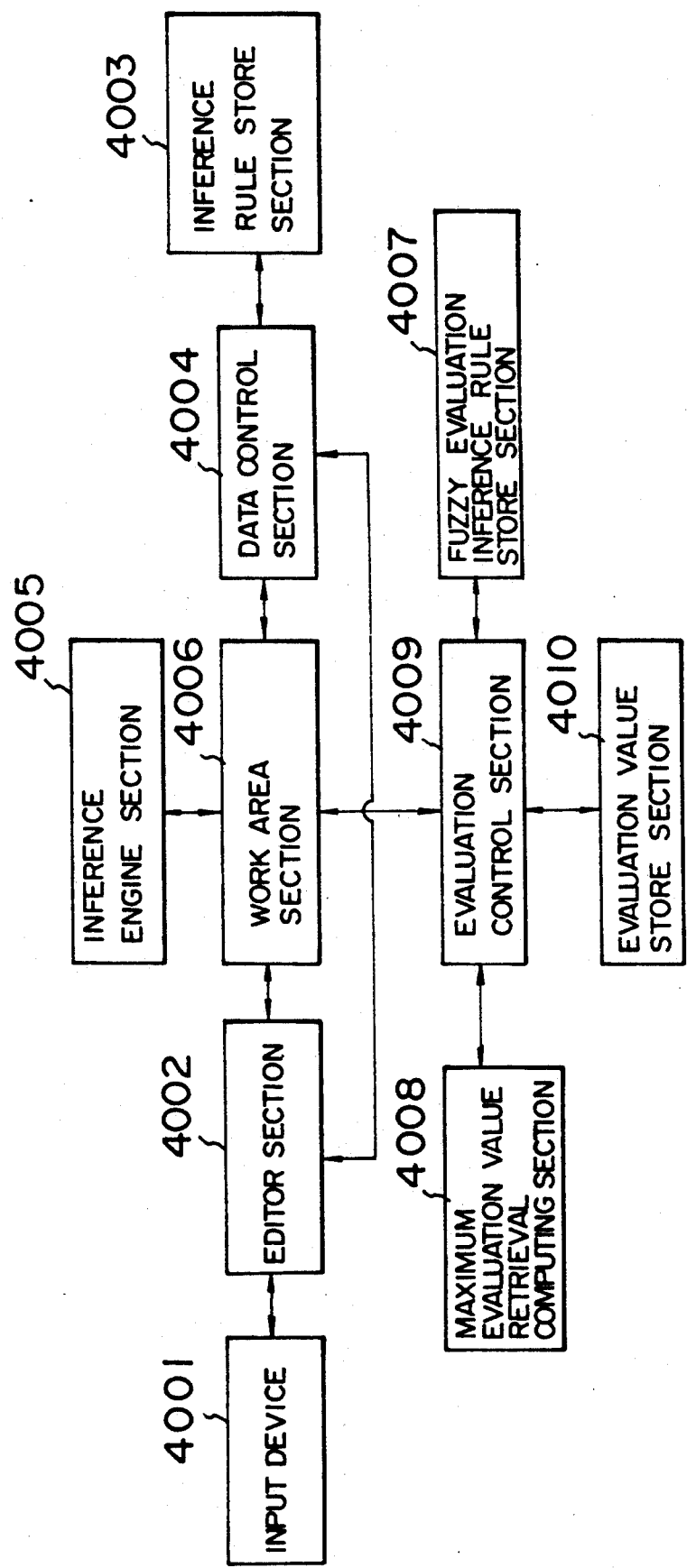
FIG. 40 is a configuration diagram showing an embodiment comprising an inference re-execution rule retrieval device.

Referring next to FIG. 40, a description will be given of an embodiment of an inference re-execution rule retrieval or search apparatus. In this system, constituent components 4001 to 4007 are identical to the components 3501 to 3507 used in the configuration of FIG. 35. Consequently, a redundant description thereof will be here omitted. Reference numeral 4010 is an evaluation value store section to store therein the evaluation values of rules for which inferences are already achieved in association with the fuzzy evaluation inference rule store section 4007. Numeral 4008 is a maximum evaluation value search or retrieval section to first obtain a father rule from which the current inference in process is attained. The father rule is used to determine a retrieval or search destination to be sequentially produced after the backtrack operation is started. Namely, this section 4008 determines, from the father knowledge source, a rule having an evaluation value next to the evaluation value of the current rule. Numeral 4009 designates an evaluation control section in which the maximum evaluation value retrieval computing section 4008 searches for rules until the evaluation value of the fuzzy evaluation inference rule store section 4007 is satisfied, thereby repeatedly achieving the multi-stage inference.

Figure 41:
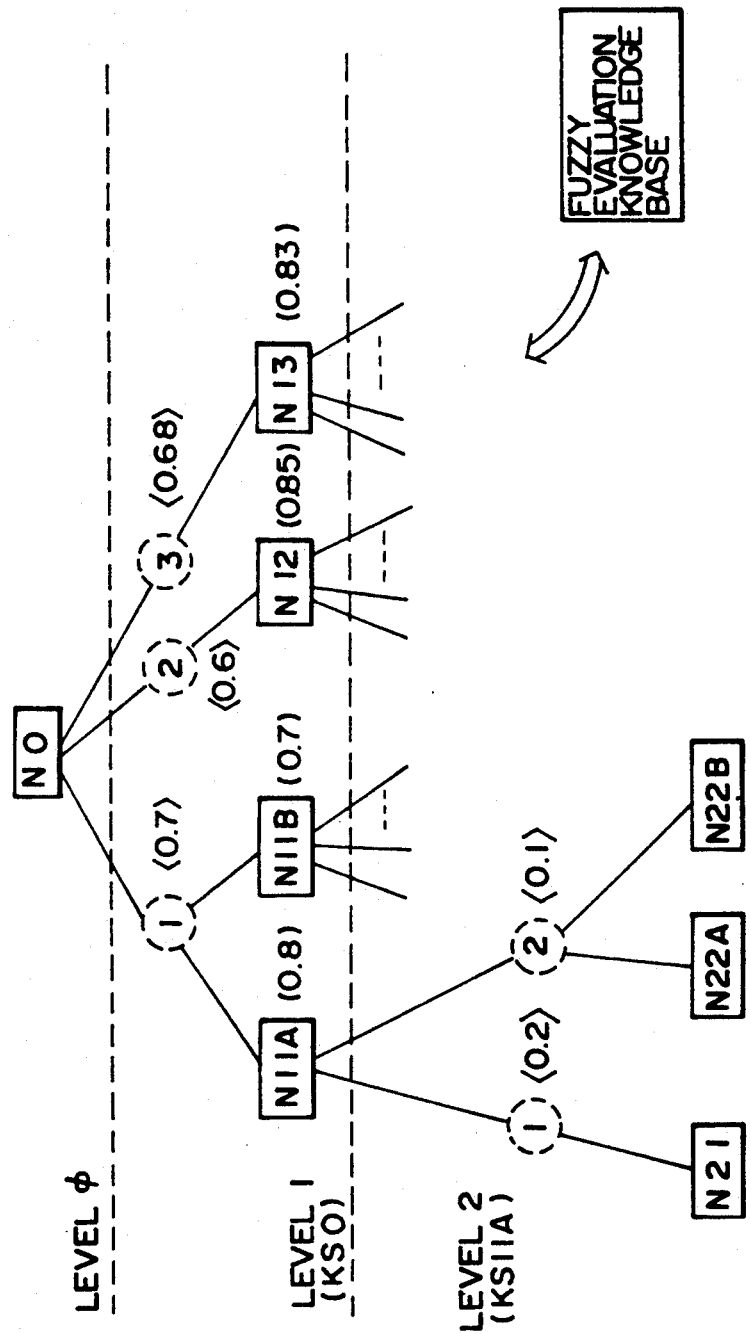
FIG. 41 is a schematic diagram showing a node retrieval associated with the FIG. 40 embodiment.

Referring next to FIGS. 40 and 41, a description will be given in more detail of the maximum evaluation value search or retrieval method used in the inference rule re-execution rule retrieval apparatus thus constructed. FIG. 41 is a node retrieval diagram associated with the multi-stage inference. In this configuration, the adaptation degrees of the respective rule antecedents and the evaluation values related to the fuzzy evaluation inference rule store section 4007 are different from those of the structure of FIG. 36.

Figure 42:
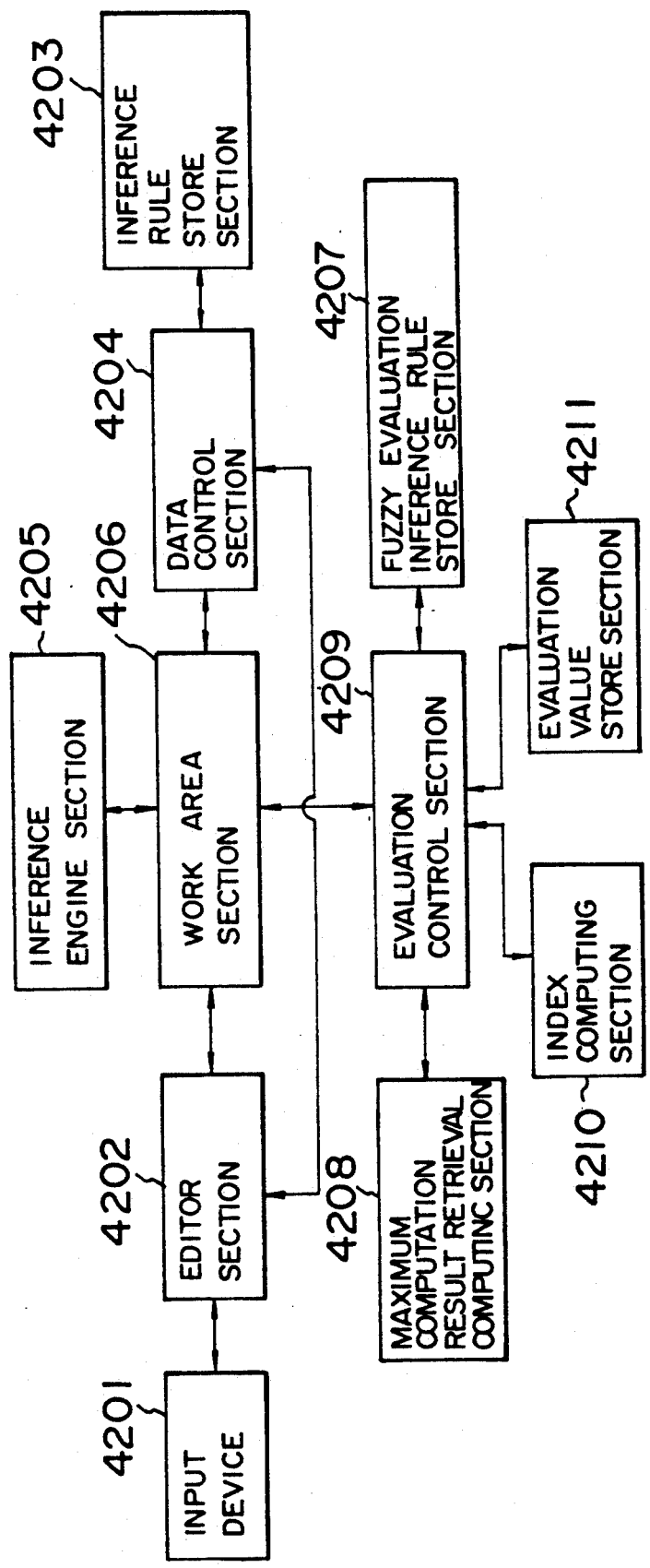
FIG. 42 is a configuration diagram showing an embodiment associated with the FIG. 40 embodiment including an inference re-execution rule retrieval device.

In accordance with the invention of FIGS. 40-42, the maximum evaluation value retrieval computing section 4008 determines a retrieval destination to be sequentially generated after the backtrack operations is started. Namely, this section 4008 determines, from the father knowledge source of the current rule, a rule having an evaluation value next to the evaluation value of the current rule. For example, in FIG. 41, assuming that the current execution node is N21, the father knowledge source from which this rule is attained is a node in the level 1. In the nodes of level 1 excepting the node N11A with a value 0.8, the node having the highest value associated with the fuzzy evaluation inference rule store section 4007 is the node N12 with a value 0.85. Consequently, the maximum evaluation value retrieval computing section 4008 selects, subsequent to the first rule of the knowledge source KS11A, the second rule of KSO. The nodes are thus selected in the node number order of NO, N11A, N21, N12, etc. In this manner, the inference is repeatedly conducted until the evaluation value of the fuzzy evaluation inference rule store section 4007 is satisfied.

Referring next to FIG. 42, a description will be given of an embodiment of the inference re-execution rule retrieval or search apparatus. In this configuration, constituent components 4201 to 4207 are identical to the components 3501 to 3507 used in the configuration of FIG. 35. Consequently, a redundant description thereof will be here omitted. Reference numeral 4211 is an evaluation value store section to store therein the evaluation values of rules for which inferences are already achieved in association with the fuzzy evaluation inference rule store section 4207. Reference numeral 4210 indicates an index computing section to achieve a computation between adaptation degrees of the respective rule antecedents with respect to the data and evaluation values in the evaluation value store section 4211. Numeral 4208 is a maximum computation result search or retrieval section to first obtain a father rule from which the current inference in process is attained. The father rule is used to determine a retrieval or search destination to be sequentially produced after the backtrack operation is started. Namely, this section 4208 determines, from the father knowledge source, a rule having a computation result next to that of the current rule. Numeral 4209 designates an evaluation control section in which the maximum computation result retrieval computing section 4208 searches for rules until the evaluation value of the fuzzy evaluation inference rule store section 4207 is satisfied, thereby repeatedly achieving the multi-stage inference.

Referring next to FIGS. 42 and 41, a description will be given in more detail of the maximum computation result search or retrieval method used in the inference rule re-execution rule retrieval apparatus thus constructed.

In accordance with the invention of FIG. 41, the maximum computation result retrieval computing section 4208 determines a retrieval destination to be sequentially generated after the backtrack operations is started. Namely, this section 4208 determines, from the father knowledge source of the current rule, a rule having an evaluation value next to the evaluation value of the current rule. For example, in FIG. 41, assuming that the current execution node is N21, the father knowledge source from which this rule is attained is a node in the level 1. Assuming that multiplication is employed as the computation between the antecedents and the evaluation values of the fuzzy evaluation inference rule store section, the multiplication values of the respective nodes in the level 1 are 0.56 (N11A), 0.49 (N11B), 0.51 (N12) and 0.5644 (N13). Consequently, in the nodes of level 1 excepting the node N11A, the node having the highest multiplication value is the node N13 with the value 0.5644. Hence, the maximum computation result retrieval computing section 4008 selects, subsequent to the first rule of the knowledge source KS11A, the third rule of KSO. The nodes are thus selected in the node number order of NO, N11A, N21, N13, etc. In this manner, the inference is repeatedly conducted until the evaluation value of the fuzzy evaluation inference rule store section 4207 is satisfied.

However, in the inventions associated with FIGS. 35-42, the results of fuzzy inferences employed in the knowledge sources are stored as values in the associated nodes.

In this embodiment, as described above, there is proposed an inference method in which a novel optimal search or retrieval function is implemented by using knowledge sources comprising production rules associated with the fuzzy inference and the conventional binary logic inference. This results in an inference re-execution rule retrieval apparatus in which knowledge bases desired by the user are retrieved to easily attain an optimal solution. Moreover, there can be constructed an inference re-execution rule retrieval apparatus suitably matching the human senses.

Figure 43:
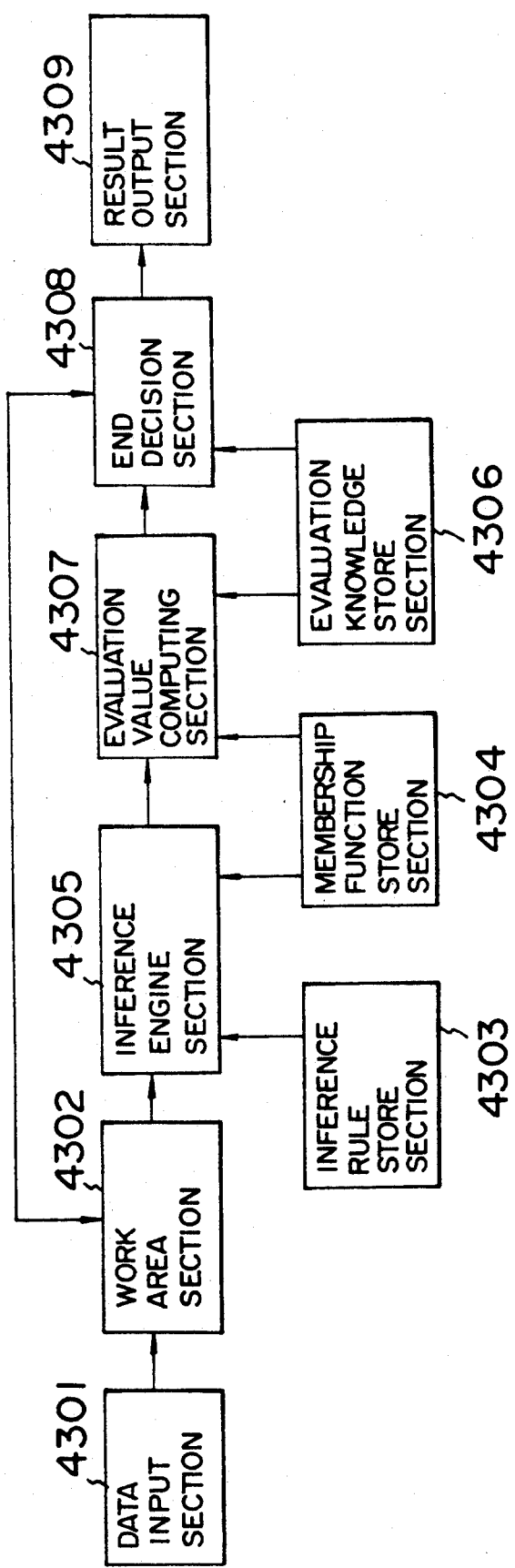
FIG. 43 is a configuration diagram showing an embodiment including an inference stop device.

Next, a description will be given of another embodiment of the invention. Modes or configurations associated with such embodiment will be described by reference to an embodiment related to FIG. 43. FIG. 43 shows a system in which a production line switching is conducted in a firm will be described. Since this system is similar to that associated with FIGS. 23-27, a redundant detail description thereabout will be omitted.

FIG. 43 is a configuration diagram of an embodiment according to the invention. In this inference, fuzzy implication inference rules are employed in a fuzzy inference to execute an inference rule of which the antecedent has the highest adaptation degree. The system of FIG. 43 includes a data input section 4301 to receive input data from an external device, a work area section 4302 to store therein the input data and inference intermediate results associated with fuzzy inferences, an inference rule store section 4303 to store therein a plurality of fuzzy implication inference rules, a membership function store section 4304 to store therein membership functions, an inference engine section 4305 to achieve fuzzy multi-stage inferences on input data from the work area section 4302 based on inference rules in the inference rule store section 4303 and membership functions in the membership function store section 4304, an evaluation knowledge store section to store therein evaluation knowledge to be used to attain evaluation values of intermediate inference results in the inference mechanism section 4305, an evaluation value computing section 4307 to attain evaluation values of intermediate inference results in the inference mechanism section 4305 based on the evaluation knowledge in the evaluation knowledge store section 4306 and membership functions in the membership function store section 4304, an end decision section 4308 to terminate an inference when the evaluation value attained by the evaluation value computing section 4307 satisfies a predetermined standard, and a result output section 4309 to output the inference result from the inference mechanism section 4305.

FIG. 44 shows a description example of the inference rule store section 4303. Since the inference rules are the same as those of FIG. 24, a redundant description thereof will be omitted. The membership functions of the fuzzy numbers "Large" and "Small" in this embodiment are identical to those of FIG. 25.

Figure 45:
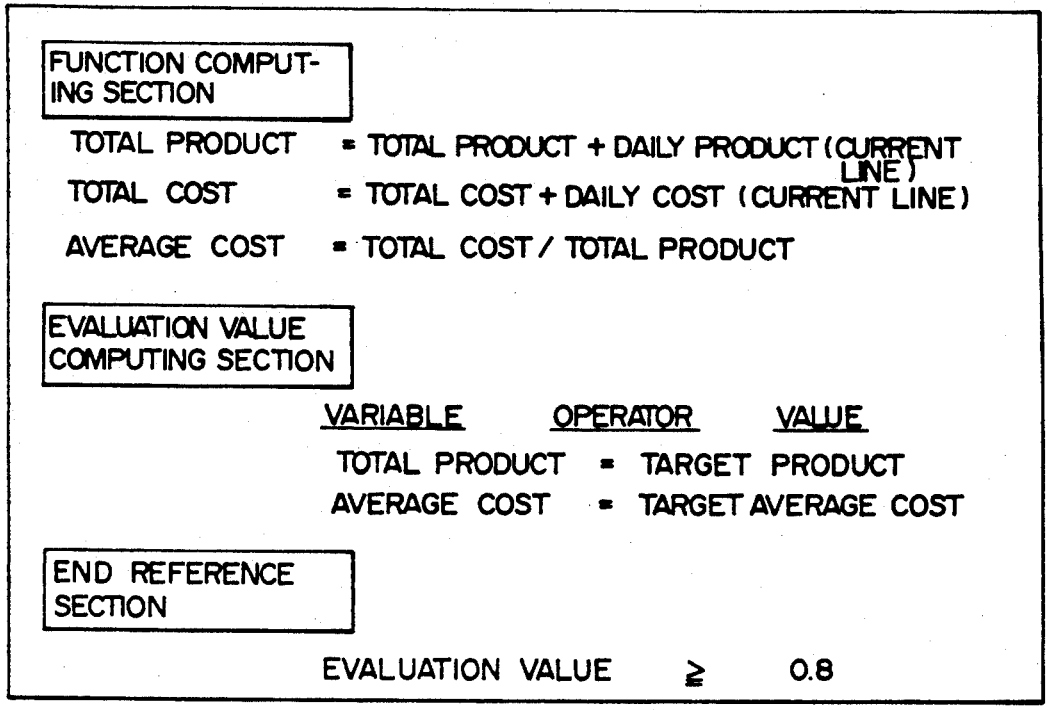
FIG. 45 is a schematic diagram showing a description example used in an evaluation computing section of the embodiment of FIG. 43.

FIG. 45 shows a description example of the evaluation knowledge store section 4306. In this embodiment, the description of the evaluation knowledge store section 4306 includes a functional operation section, an evaluation value computing section, and an end standard section. Since the functional operation section and the evaluation value computing section are identical to those of FIG. 29, a description thereof will be omitted.

A description will now be given of this embodiment. In the evaluation knowledge store section 4306, as a final decision of an inference, local fuzzy variables (the total production, the total cost, and the average cost) are obtained from an intermediate inference result (a kind of line). Under conditions that the total production is equal to the target production and the average cost is identical to the target average cost, an adaptation degree is determined as an evaluation value. When the evaluation value is equal to or more than a predetermined value (as indicated in the diagram, 0.8 for example), the inference is terminated. Since the method of computing the evaluation value is the same as that used in the embodiment associated with FIG. 29, a description thereof will be omitted.

A description will next be given of the operation of the inference terminating apparatus associated with FIG. 43 in accordance with the present invention. On receiving initial input data, the data input section 4301 supplies the input data to the work area section 4302. Receiving the data from the work area section 4302, the inference engine section 4305 attains adaptation degrees of the antecedents of inference rules according to the method above by use of fuzzy inference rules in the inference rule store section 4303 and membership functions in the membership function store section 4304. Based on an inference rule having the maximum adaptation degree, an intermediate result of the inference is obtained. The evaluation value computing section 4308 computes an evaluation value of the intermediate inference result in accordance with the method above by use of membership functions in the membership function store section 4304 and evaluation knowledge in the evaluation knowledge store section 4306. The end or termination decision section 4308 completes the inference when the evaluation value satisfies the preset evaluation standard (evaluation value $\geq 0.8$). When the inference is not ended, the termination decision section 4308 stores the intermediate inference result in the work area section 4302. Subsequently, the intermediate inference result stored in the work area section 4302 is again supplied to the inference engine section 4305 to repeatedly achieve the operation above, thereby conducting the multi-stage inference. However, when an inference rule of which the antecedent has an adaptation degree not less than the preset standard value is not found, a backtrack operation is carried out. Namely, data used in a cycle preceding the current cycle by several cycles is employed as an input to another inference rule. An inference is thus conducted. Similarly, when the evaluation value satisfies the predetermined evaluation standard, the inference is terminated.

Figure 46:
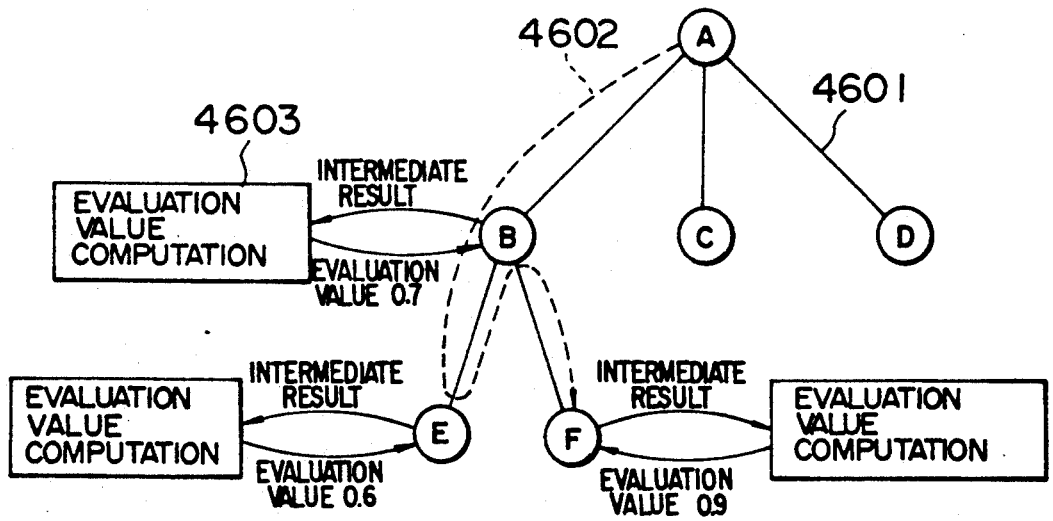
FIG. 46 is a diagram schematically showing an operation example of the embodiment of FIG. 43.

FIG. 46 shows an example of the multi-stage inference in this embodiment. The diagram of FIG. 46 includes an initial input A, intermediate inference results B to F, a solid line 4601 denoting an inference rule of which the antecedent matches with input data, a broken line 4602 designating an inference route of an actual inference, and a block 4603 indicating a computation of an evaluation value in the evaluation value computing section 4307. When an inference is initiated by use of the initial input A, the intermediate results B, C, and D are produced. Based on these results, the evaluation value computing section 4307 obtains an evaluation value of B of which the antecedent has the highest adaptation degree. Since the evaluation value of B does not satisfy the evaluation standard (evaluation value $\geq 0.8$), the inference is continued. By use of the result B, the next inference is conducted to attain the intermediate results E and F. The evaluation value of E of which the antecedent has the highest adaptation degree does not satisfy the evaluation standard (evaluation value $\geq 0.8$), and hence the inference is continues. However, for the result E, there does not exist an inference rule of which the antecedent has an adaptation degree not less than the standard value. Consequently, a backtrack operation is conducted to pass control to the result B. Another inference rule is then employed to attain the intermediate result F. Since the evaluation value of F satisfies the evaluation standard (evaluation value $\geq 0.8$), the inference is terminated. The intermediate inference result F is outputted as the final inference result.

Incidentally, although this embodiment employs fuzzy implication inference rules for the inference, implication inference rules of the binary logic may also be used for the inference. Furthermore, the evaluation knowledge store section includes the functional operation section, the evaluation value computing section, and the end standard section; however, the functional operation section may be omitted. Moreover, although the evaluation value computing section uses as the evaluation value the adaptation degrees of a fuzzy condition, the general functional operation may also be adopted or a fuzzy inference may be conducted to obtain an evaluation value.

As described above, an inference can be conducted with fuzzy or ambiguous knowledge and hence knowledge of experts can be described in inference rules to implement an inference function, which increases the practicability of the invention. Moreover, the user's ambiguous language expressions can be used to arbitrarily describe flexible knowledge, which is, although fuzzy, in a knowledge base. In consequence, not only the inference of the conventional expert system but also the fuzzy inference can be used for the multistage inference. As a result, there can be configured a system in which human senses are more suitably represented as compared with the conventional system, which increases the practicability of the invention. Moreover, the user can clearly specify an execution priority order or a conviction degree of an inference rule. Consequently, even when a consequent of the rule contains a confirmative or determinant action, contentions between inference rules can be solved, thereby executing an optimal inference rule in any situation. Furthermore, a fuzzy label can be used to transfer an intermediate result of a fuzzy inference to a subsequent inference, which enables a fuzzy multistage inference to be accomplished. As a result, there can be achieved an inference which is more similar to the human inference as compared with a one-stage inference, which enhances the practicability of the invention. Moreover, there is developed a multi-stage inference in which a backtrack operation is conducted depending on fuzzy or ambiguous knowledge. Consequently, ambiguous knowledge of the user can be easily reflected onto the inference rules, which leads to an advantageous effect. Furthermore, in contrast to the conventional method in which the fuzzy and binary logic inferences are continuously achieved from an upper-level search or retrieval point to a lower-level search point in a one-directional manner and hence the user cannot obtain a satisfactory knowledge source, a novel inference method taking a best value retrieval function into consideration is proposed to easily detect an optimal solution. As a result, for the user, there can be constructed a multi-stage fuzzy inference apparatus matching with the human senses, which considerably improves the practicability of the invention. Moreover, the user can describe inference rules without paying attention to the difficulty of description of the end instruction. Namely, the user can terminate the inference at a satisfactory inference stage. As a result, there can be configured a system which can be easily operated by the user, thereby increasing the practicability of the invention.

While particular embodiments of the invention have been shown and described, it will be obvious to those skilled in the art that various changes and modifications may be made without departing from the present invention in its broader aspects.

We claim:

1. A fuzzy multi-stage inference apparatus to be employed in information processing systems for diagnosis or recognition purposes, comprising:
   an inference rule memory for storing fuzzy inference rules comprising IF parts, THEN parts, and Boolean logic inference rules;
   an inference means for deriving control commands for executing multi-step inference processing comprising one of (i) fuzzy logic inferences and (ii) fuzzy logic and Boolean logic inferences in series or in parallel by utilizing said rules stored in said inference rule memory; and
   an inference rule selector for determining, by using an evaluation formula, a priority inference rule to be executed by said inference means in a succeeding step in said multi-step inference processing;
   wherein:
   said inference means outputs a portion of the fuzzy inference rules stored in said inference rule memory to a working region of said memory;
   said inference means executes said multi-step inference processing by using only said inference rules outputted to said working region,
   said inference rules are divided into plural knowledge sources each of which comprises fuzzy inference rules and Boolean logic inference rules,
   said inference means outputs said fuzzy inference rules and said Boolean logic inference rules in one of said knowledge sources to said working region for use in execution of fuzzy logic and Boolean logic inferences, and
   said inference rule selector comprises a priority memory in which said priority of inference rules is stored; a compatibility processor for deriving a compatibility of said inference rule to said IF parts; and an inference rule determination means for deriving an inference rule having a priority of more than a predetermined value and a highest priority in said priority memory.

2. A fuzzy multi-stage inference apparatus to be employed in information processing systems for diagnosis or recognition purposes, comprising:
   an inference rule memory for storing fuzzy inference rules comprising IF parts, THEN parts, and Boolean logic inference rules;
   an inference means for deriving control commands for executing multi-step inference processing comprising one of (i) fuzzy logic inferences and (ii) fuzzy logic and Boolean logic inferences in series or in parallel by utilizing said rules stored in said inference rule memory; and
   an inference rule selector for determining, by using an evaluation formula, a priority inference rule to be executed by said inference means in a succeeding step in said multi-step inference processing;
   wherein:
   said inference means outputs a portion of the fuzzy inference rules stored in said inference rule memory to a working region of said memory;
   said inference means executes said multi-step inference processing by using only said inference rules outputted to said working region,
   said inference rules are divided into plural knowledge sources each of which comprises fuzzy inference rules and Boolean logic inference rules,
   said inference means outputs said fuzzy inference rules and said Boolean logic inference rules in one of said knowledge sources to said working region for use in execution of fuzzy logic and Boolean logic inferences, and
   said inference rule selector comprises a reliability memory in which a representation of reliability of said inference rule is stored; a compatibility processor for determining the compatibility of said IF parts; a priority processor to determine priority between said inference rule in said compatibility processor and said reliability in said reliability memory to derive a priority inference rule; and an execution rule determination means for deriving a fuzzy inference rule having a highest priority in said priority processor.

3. A fuzzy multi-stage inference apparatus to be employed in information processing systems for diagnosis or recognition purposes, comprising:
   an inference rule memory for storing fuzzy inference rules comprising IF parts, THEN parts, and Boolean logic inference rules; and
   an inference means for deriving control commands for executing multi-step inference processing comprising one of (i) fuzzy logic inferences and (ii) fuzzy logic and Boolean logic inferences in series or in parallel by utilizing said rules stored in said inference rule memory;
   wherein:

said inference means outputs a portion of the fuzzy inference rules stored in said inference rule memory to a working region of said memory, said inference means executes said multi-step inference processing by using only said inference rules outputted to said working region, said inference rules are divided into plural knowledge sources each of which comprises fuzzy inference rules or Boolean logic inference rules, and said inference means outputs fuzzy inference rules of some of said knowledge sources to said working region for use in executing said fuzzy logic and/or Boolean logic inferences, said apparatus further comprising an intermediate result determination means for determining an intermediate result and a final result to derive a priority fuzzy inference rule by using a fuzzy inference to determine an inference rule to be executed next by said inference means.

4. A fuzzy multi-stage inference apparatus to be employed in information processing systems for diagnosis or recognition purposes, comprising:

an inference rule memory for storing fuzzy inference rules comprising IF parts, THEN parts, and Boolean logic inference rules; and an inference means for deriving control commands for executing multi-step inference processing comprising one of (i) fuzzy logic inferences and (ii) fuzzy logic and Boolean logic inferences in series or in parallel by utilizing said rules stored in said inference rule memory, wherein:

said inference means outputs a portion of the fuzzy inference rules stored in said inference rule memory to a working region of said memory, said inference means executes said multi-step inference processing by using only said inference rules outputted to said working region, said inference rules are divided into plural knowledge sources each of which comprises fuzzy inference rules or Boolean logic inference rules, and said inference means outputs fuzzy inference rules of some of said knowledge sources to said working region for use in executing said fuzzy logic and/or Boolean logic inferences, said apparatus further comprising an inference re-execution starting means for determining timing to start a re-execution of said multi-stage inference and an inference rule to be re-executed by using knowledge comprising fuzzy sets.

5. A fuzzy multi-stage inference to be employed in information processing systems for diagnosis or recognition purposes, comprising:

an inference rule memory for storing fuzzy inference rules comprising IF parts, THEN parts, and Boolean logic inference rules; and an inference means for deriving control commands for executing multi-step inference processing comprising one of (i) fuzzy logic inferences and (ii) fuzzy logic and Boolean logic inferences in series or in parallel by utilizing said rules stored in said inference rule memory, wherein:

said inference means outputs a portion of the fuzzy inference rules stored in said inference rule memory to a working region of said memory, said inference means executes said multi-step inference processing by using only said inference rules outputted to said working region, said inference rules are divided into plural knowledge sources each of which comprises fuzzy inference rules or Boolean logic inference rules, and said inference means outputs fuzzy inference rules of some of said knowledge sources to said working region for use in executing said fuzzy logic and/or Boolean logic inferences, said apparatus further comprising an inference concluding means for determining an ending of said multi-stage inference apparatus process by using knowledge described in fuzzy sets.

6. A fuzzy multi-stage inference apparatus to be employed in information processing systems for diagnosis or recognition purposes, comprising:

an inference rule memory for storing fuzzy inference rules comprising IF parts, THEN parts, and Boolean logic inference rules; and an inference means for deriving control commands for executing multi-step inference processing comprising one of (i) fuzzy logic inferences and (ii) fuzzy logic and Boolean logic inferences in series or in parallel by utilizing said rules stored in said inference rule memory, wherein:

said inference means outputs a portion of the fuzzy inference rules stored in said inference rule memory to a working region of said memory, said inference means executes said multi-step inference processing by using only said inference rules outputted to said working region, said inference rules are divided into plural knowledge sources each of which comprises fuzzy inference rules and Boolean logic inference rules, and said inference means outputs said fuzzy inference rules and said Boolean logic inference rules in one of said knowledge sources to said working region for use in execution of fuzzy logic and Boolean logic inferences, said apparatus further comprising an intermediate result determination means for determining an intermediate result and a final result to derive a priority fuzzy inference rule by using a fuzzy inference to determine an inference rule to be executed next by said inference means.

7. A fuzzy multi-stage inference apparatus according to claim 6 wherein said intermediate result determination means comprises an intermediate result inference means for executing said fuzzy inference and an intermediate result working region to store results of said fuzzy inference; and said intermediate result inference means re-executes inferences after converting an intermediate result of fuzzy inference into real values.

8. A fuzzy multi-stage inference apparatus according to claim 7 wherein said intermediate result determination means determines real values of said intermediate result by deriving a centroid of a fuzzy set determined by said fuzzy inference.

9. A fuzzy multi-stage inference apparatus according to claim 6 wherein said intermediate result determination means comprises an intermediate result inference means for executing said fuzzy inference and an intermediate result working region to store results of said fuzzy inference; and said intermediate result inference means re-executes said inferences based upon both real values of said intermediate result of fuzzy inference and newly inputted data.

10. A fuzzy multi-stage inference apparatus according to claim 9 wherein said intermediate result determination means determines real values of said intermediate result by deriving a centroid of a fuzzy set determined by said fuzzy inference.

11. A fuzzy multi-stage inference apparatus according to claim 6 wherein said intermediate result determination means comprises an intermediate result inference means for executing said fuzzy inference and an intermediate result working region to store said inference results; and said intermediate result inference means re-inputs a fuzzy set obtained by said fuzzy inference into said intermediate result inference means after said fuzzy set is substituted by fuzzy labels in order to execute multi-stage inferences by using said fuzzy labels.

12. A fuzzy multi-stage inference apparatus according to claim 11 wherein a fuzzy label for minimizing the difference between an intermediate result of a fuzzy set and an area of a fuzzy label intermediately obtained by fuzzy inference is selected.

13. A fuzzy multi-stage inference apparatus according to claim 6 wherein said intermediate result determination means comprises an intermediate result inference means for executing said fuzzy inference and an intermediate results working region to store said-inference results; and said intermediate result inference means re-inputs a fuzzy set obtained by said fuzzy inference into said intermediate result inference means after said fuzzy set is substituted by fuzzy labels in order to execute multi-step inferences by considering both said fuzzy labels and newly inputted data.

14. A fuzzy multi-stage inference apparatus according to claim 13 wherein a fuzzy label for minimizing the difference between an intermediate result of a fuzzy set and an area of a fuzzy label intermediately obtained by fuzzy inference is selected.

15. A fuzzy multi-stage inference apparatus according to claim 6 wherein said intermediate result determination means comprises an intermediate result inference means for executing said fuzzy inference and an intermediate working region to store said inference results;

said intermediate result inference means comprises a multi-step inference means for converting said intermediate results of said fuzzy inference into real values; and a multi-step inference means for substituting said fuzzy sets obtained by said fuzzy inference by fuzzy labels.

16. A fuzzy multi-stage inference apparatus to be employed in information processing systems for diagnosis or recognition purposes, comprising:

an inference rule memory for storing fuzzy inference rules comprising IF parts, THEN parts, and Boolean logic inference rules; and an inference means for deriving control commands for executing multi-step inference processing comprising one of (i) fuzzy logic inferences and (ii) fuzzy logic and Boolean logic inferences in series or in parallel by utilizing said rules stored in said inference rule memory, wherein:

said inference means outputs a portion of the fuzzy inference rules stored in said inference rule memory to a working region of said memory, said inference means executes said multi-step inference processing by using only said inference rules outputted to said working region, said inference rules are divided into plural knowledge sources each of which comprises fuzzy inference rules or Boolean logic inference rules, and said inference means outputs fuzzy inference rules of some of said knowledge sources to said working region for use in executing said fuzzy logic and/or Boolean logic inferences, said apparatus further comprising an inference re-execution starting means for determining timing to start a re-execution of said multi-stage inference and an inference rule to be re-executed by using knowledge comprising fuzzy sets.

17. A fuzzy multi-stage inference apparatus according to claim 16 wherein said inference re-execution starting means commences said re-execution of inference only when a compatibility of said input data to said IF parts of fuzzy inference rules satisfies a predetermined criterion.

18. A fuzzy multi-stage inference apparatus according to claim 17 further comprising an inference re-execution rule searching means for determining inference rules to be searched at said re-execution of inference.

19. A fuzzy multi-stage inference apparatus according to claim 18 wherein said inference re-execution rule searching means searches for inference rules in an order of higher adaptability of a given number of inference rules comprising an antecedent.

20. A fuzzy multi-stage inference apparatus according to claim 18 wherein said inference re-execution rule searching means searches for an inference rule having a next highest adaptability to that of a final inference rule among inference rules in aid knowledge source and/or a preceding knowledge source.

21. A fuzzy multi-stage inference apparatus according to claim 18 wherein said inference re-execution rule searching means comprises a fuzzy result evaluation means for determining user satisfaction of said inference result attained by using knowledge described in a fuzzy set; and a best solution searching processor for finding a best command from THEN parts of said inference rules which led to executed inference rules.

22. A fuzzy multi-stage inference apparatus according to claim 18 wherein said inference re-execution rule searching means comprises a fuzzy result evaluation means for determining user satisfaction with said inference results attained by using knowledge described in a fuzzy set; and a maximum evaluation value searching processor by which a rule with a highest evaluation value is searched as a result of fuzzy inference among a knowledge source to which said inference rule which led to an executed inference rule belongs.

23. A fuzzy multi-stage inference apparatus according to claim 18 wherein said inference re-execution-rule searching means comprises a fuzzy result evaluation means for evaluating user satisfaction of said inference results attained by using a knowledge described in a fuzzy set;

an exponential processor which conducts exponential processing by using said adaptability of said antecedent and an evaluation value derived by said fuzzy result evaluation part; and a maximum processing result processor for searching for an inference rule by which a highest processing result can be derived among knowledge that an inference rule which led to an executed inference rule belongs.

24. A fuzzy multi-stage inference apparatus according to claim 23, wherein said evaluation means is executed by a multiplication process executed by an exponential processor.

25. A fuzzy multi-stage inference apparatus according to claim 23, wherein said evaluation is executed by a minimum deriving process executed by an exponential processor.

26. A fuzzy multi-stage inference apparatus according to claim 16 wherein said inference re-execution starting means comprises a fuzzy result evaluation means for evaluating a user satisfaction of an inference result; and a back-track determination means for determining a re-execution of said inference determines when an evaluation derived by said fuzzy result evaluation part has satisfied a predetermined criterion.

27. A fuzzy multi-stage inference apparatus according to claim 26 further comprising an inference re-execution rule searching means for determining inference rules to be searched at said re-execution of inference.

28. A fuzzy multi-stage inference apparatus to be employed in information processing systems for diagnosis or recognition purposes, comprising:

an inference rule memory for storing fuzzy inference rules comprising IF parts, THEN parts, and Boolean logic inference rules; and an inference means for deriving control commands for executing multi-step inference processing comprising one of (i) fuzzy logic inferences and (ii) fuzzy logic and Boolean logic inferences in series or in parallel by utilizing said rules stored in said inference rule memory, wherein:

said inference means outputs a portion of the fuzzy inference rules stored in said inference rule memory to a working region of said memory, said inference means executes said multi-step inference processing by using only said inference rules outputted to said working region, said inference rules are divided into plural knowledge sources each of which comprises fuzzy inference rules and Boolean logic inference rules, and said inference means outputs said fuzzy inference rules and said Boolean logic inference rules in one of said knowledge sources to said working region for use in execution of fuzzy logic and Boolean logic inferences, said apparatus further comprising an inference concluding means for determining an ending of said multi-stage inference apparatus process by using knowledge described in fuzzy sets.

29. A fuzzy multi-stage inference apparatus according to claim 28 wherein said inference concluding means comprises a fuzzy result evaluation means for determining user satisfaction of a result of said multi-stage inference; and a conclusion determining means for determining an ending of said multi-stage inference when an evaluation of said inference has satisfied a predetermined criterion.

* * * * *